United States Patent
Cho et al.

(10) Patent No.: US 10,521,789 B2
(45) Date of Patent: Dec. 31, 2019

(54) PAYMENT SYSTEM, ELECTRONIC DEVICE AND PAYMENT METHOD THEREOF

(71) Applicant: Samsung Electronics Co., Ltd., Suwon-si, Gyeonggi-do (KR)

(72) Inventors: Boo Hyun Cho, Yongin-si (KR); Ki Bong Kim, Daegu (KR); Beom Soo Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 15/209,143

(22) Filed: Jul. 13, 2016

(65) Prior Publication Data

US 2017/0330170 A1 Nov. 16, 2017

Related U.S. Application Data

(60) Provisional application No. 62/192,253, filed on Jul. 14, 2015.

(30) Foreign Application Priority Data

Sep. 21, 2015 (KR) ........................ 10-2015-0133017

(51) Int. Cl.
*G06Q 40/00* (2012.01)
*G06Q 20/32* (2012.01)
(Continued)

(52) U.S. Cl.
CPC ........... *G06Q 20/3278* (2013.01); *G06K 7/08* (2013.01); *G06K 19/06206* (2013.01);
(Continued)

(58) Field of Classification Search
USPC ......................................... 235/375, 379, 380
See application file for complete search history.

(56) References Cited

U.S. PATENT DOCUMENTS 5,221,838 A * 6/1993 Gutman ................ G06Q 20/32
235/379
6,764,003 B1 7/2004 Martschitsch et al.
(Continued)

FOREIGN PATENT DOCUMENTS

JP 2013-530445 A 7/2013
KR 10-2014-0025431 A 3/2014
(Continued)

OTHER PUBLICATIONS

European Search Report dated Jul. 13, 2018, issued in European Patent Application No. 18165559.8.
(Continued)

*Primary Examiner* — Jamara A Franklin
(74) *Attorney, Agent, or Firm* — Jefferson IP Law, LLP

(57) ABSTRACT

An electronic device for making a payment is provided. The electronic device includes a display configured to receive a user command, a transceiver configured to communicate with an external device, and a processor configured to request a token associated with a financial service from a payment server when a user requests the financial service and to generate data for providing the financial service by using the token and service information when the token and the service information associated with the financial service is received from the payment server.

16 Claims, 14 Drawing Sheets

(51) Int. Cl.
*G06K 7/08* (2006.01)
*G06K 19/06* (2006.01)
*G06Q 20/34* (2012.01)
*G06Q 20/40* (2012.01)
*H04B 5/00* (2006.01)
*G06Q 20/38* (2012.01)
*H04L 1/00* (2006.01)

(52) U.S. Cl.
CPC ....... *G06Q 20/322* (2013.01); *G06Q 20/3226* (2013.01); *G06Q 20/3415* (2013.01); *G06Q 20/3572* (2013.01); *G06Q 20/385* (2013.01); *G06Q 20/40* (2013.01); *G06Q 20/40145* (2013.01); *H04B 5/0031* (2013.01); *H04L 1/0011* (2013.01)

(56) References Cited

U.S. PATENT DOCUMENTS

| | | |
|---|---|---|
| 7,506,812 B2 | 3/2009 | Von Mueller et al. |
| 7,568,621 B2 | 8/2009 | Von Mueller et al. |
| 7,740,173 B2 | 6/2010 | Von Mueller et al. |
| 8,249,993 B2 | 8/2012 | Von Mueller |
| 8,628,012 B1 | 1/2014 | Wallner |
| 8,690,059 B1 | 4/2014 | Wallner |
| 8,814,046 B1 | 8/2014 | Wallner |
| 8,870,081 B2 | 10/2014 | Olson et al. |
| 8,876,011 B2 | 11/2014 | Olson et al. |
| 8,893,967 B2 | 11/2014 | Hammad et al. |
| 8,925,826 B2 | 1/2015 | Liu et al. |
| 9,022,285 B2 | 5/2015 | Graylin |
| 9,123,036 B2 | 9/2015 | Graylin et al. |
| 9,195,983 B2 | 11/2015 | Graylin |
| 9,245,220 B2 | 1/2016 | Olson et al. |
| 9,286,561 B2 | 3/2016 | Olson et al. |
| 9,412,105 B2 | 8/2016 | Graylin et al. |
| 2006/0049256 A1 | 3/2006 | Von Mueller et al. |
| 2007/0276765 A1 | 11/2007 | Hazel et al. |
| 2008/0040284 A1 | 2/2008 | Hazel et al. |
| 2008/0149718 A1 | 6/2008 | Von Mueller et al. |
| 2008/0223932 A1 | 9/2008 | Mueller et al. |
| 2008/0243701 A1 | 10/2008 | Von Mueller |
| 2010/0327054 A1 | 12/2010 | Hammad |
| 2012/0123883 A1 | 5/2012 | Charrat |
| 2012/0123945 A1 | 5/2012 | Charrat |
| 2012/0280035 A1 | 11/2012 | Liu et al. |
| 2012/0330843 A1 | 12/2012 | Von Mueller et al. |
| 2013/0024372 A1 | 1/2013 | Spodak et al. |
| 2013/0140360 A1 | 6/2013 | Graylin |
| 2013/0275307 A1 | 10/2013 | Khan |
| 2013/0282570 A1 | 10/2013 | Charrat et al. |
| 2013/0320080 A1 | 12/2013 | Olson et al. |
| 2013/0320081 A1 | 12/2013 | Olson et al. |
| 2014/0108260 A1 | 4/2014 | Poole et al. |
| 2014/0144984 A1 | 5/2014 | Olson et al. |
| 2014/0246490 A1 | 9/2014 | Graylin |
| 2014/0249948 A1 | 9/2014 | Graylin et al. |
| 2014/0269946 A1 | 9/2014 | Wallner |
| 2014/0344153 A1 | 11/2014 | Raj et al. |
| 2015/0112870 A1 | 4/2015 | Nagasundaram et al. |
| 2015/0127549 A1 | 5/2015 | Khan |
| 2015/0134537 A1 | 5/2015 | Hammad |
| 2015/0134540 A1 | 5/2015 | Law et al. |
| 2015/0161497 A1 | 6/2015 | Olson et al. |
| 2015/0161498 A1 | 6/2015 | Olson et al. |
| 2015/0161592 A1 | 6/2015 | Park et al. |
| 2015/0324788 A1 | 11/2015 | Graylin et al. |
| 2016/0260088 A1 | 9/2016 | Olson et al. |

FOREIGN PATENT DOCUMENTS

| | | |
|---|---|---|
| KR | 10-2015-0065353 A | 6/2015 |
| WO | 2013/155627 A1 | 10/2013 |
| WO | 2015/095517 A1 | 6/2015 |

OTHER PUBLICATIONS

Korean Notice of Allowance dated Jun. 14, 2017, issued in the Korean Patent Application No. 10-2017-0044146.
European Office Action dated Dec. 1, 2017, issued in the European Patent Application No. 16 179 443.3.

\* cited by examiner

FIG. 6A

| 1-16 | 17 | 18-23 | 24-27 | 28-37 |
|---|---|---|---|---|
| TOKEN NUMBER | = | TOKEN VALIDITY PERIOD | PAYMENT CODE | MSD AREA |

Positions 33-37: ALLIANCE SERVICE BETWEEN CARD COMPANY AND POS

FIG. 6B

Positions 1-2: START CODE
Positions 3-5: TYPE CODE
Positions 6-11: VALIDITY PERIOD (YYMM)
Positions 12-22: COUNTRY CODE
Positions 23-27: GEOGRAPHICAL SEPARATION CODE
Positions 28-31: TYPE OF CURRENCY
Positions 32-36: MONEY UNIT
Positions 89-91: (shaded block)
Positions 92-104: ARBITRARY USE FOR EACH ROW
Positions 105-106: END CODE
Position 107: LRC

PAYMENT SYSTEM, ELECTRONIC DEVICE AND PAYMENT METHOD THEREOF

CROSS-REFERENCE TO RELATED APPLICATION(S)

This application claims the benefit under 35 U.S.C. § 119(e) of a U. S. Provisional application filed on Jul. 14, 2015 in the U. S. Patent and Trademark Office and assigned Ser. No. 62/192,253, and under 35 U.S.C. § 119(a) of a Korean patent application filed on Sep. 21, 2015 in the Korean Intellectual Property Office and assigned Serial number 10-2015-0133017, the entire disclosure of each of which is hereby incorporated by reference.

TECHNICAL FIELD

The present disclosure relates to a payment method using a portable electronic device.

BACKGROUND

Electronic devices are implemented in various forms and include, for example, a smartphone that a user carries, a wearable device that is attached to a part of the body of a user, and the like. With the development of information technologies (IT), the electronic devices have significantly superior functions and provide a user with various functions.

Nowadays, financial technology (hereinafter referred to as "Fin-tech") that is a combination of the finance technology and the IT gets attention. The Fin-tech that is evaluated as the financial paradigm shift extends its boundary to an off-line financial service and a finance platform building service as well as an on-line financial service according to the related art.

For example, manufacturers of electronic devices make various efforts to develop the electronic devices for realizing the fin-tech and build payment systems through the cooperation of a credit card company or a bank.

The payment system using a portable electronic device makes a payment by sending payment information to a payment device by using a local area communication technology such as near field communication (NFC), magnetic secure transmission (MST), or the like. With regard to an MST manner, the payment system makes a payment by sending track data including the payment information recorded on an existing magnetic card to a payment device.

With regard to a payment method using the MST, an electronic device receives and stores track data included in the payment information. When a payment is required, the electronic device makes a payment by using the stored track data. However, the electronic device fails to change information included in the track data issued according to the request of a user by using the track data stored in the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that variably generates track data based on a request of a user or a use purpose of a service when sending payment information through MST and a payment method thereof.

In accordance with an aspect of the present disclosure, an electronic device is provided. The electronic device includes a display configured to receive a user command, a transceiver configured to communicate with an external device, and a processor configured to request a token associated with a financial service from a payment server when a user requests the financial service and to generate data for providing the financial service by using the token and service information when the token and the service information associated with the financial service is received from the payment server.

In accordance with another aspect of the present disclosure, a payment method of an electronic device is provided. The payment method includes receiving a financial service request from a user, requesting a token associated with the financial service from a payment server, receiving the token and service information associated with the financial service from the payment server, and generating data for providing the financial service by using the token and the service information.

In accordance with another aspect of the present disclosure, a server is provided. The server includes a transceiver configured to communicate with an external device, a memory configured to store available service information for each user, and a processor configured to request a token from a finance server when an electronic device requests the token associated with a financial service, to check the service information available to a user of the electronic device when the token is received from the finance server, and to generate data for providing the financial service by using the token and the available service information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A and 6B are views of track data according to various embodiments of the present disclosure;

Throughout the drawings, it should be noted that like reference numbers are used to depict the same or similar elements, features, and structures.

DETAILED DESCRIPTION

Figure 1:
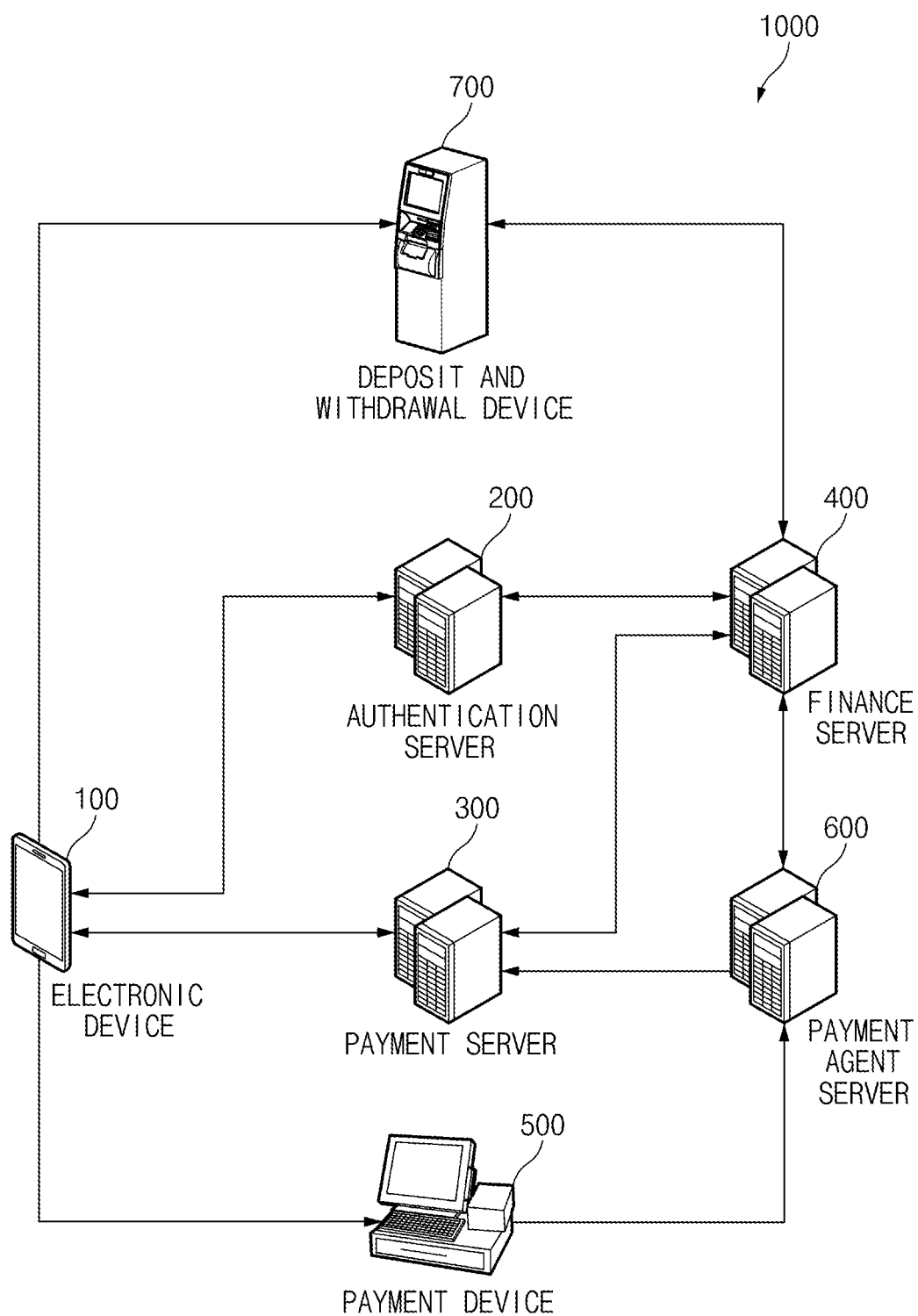
FIG. 1 is a diagram illustrating a payment system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include, for example, at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group phase 1 or phase 2 (MPEG-1 or MPEG-2) audio layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiment of the present disclosure will be described with reference to the accompanying drawings. The term "user" used herein may refer to a person who uses an electronic device or may refer to a device (e.g., an artificial intelligence electronic device) that uses an electronic device.

FIG. 1 is a diagram illustrating a payment system according to an embodiment of the present disclosure.

Referring to FIG. 1, a payment system 1000 may include an electronic device 100, an authentication server 200, a payment server 300, a finance server 400, a payment device 500, a payment agent server (or payment gateway server) 600, and a deposit and withdrawal device 700. The devices included in the payment system 1000 illustrated in FIG. 1 may be connected with each other through a network. For example, elements may be connected with each other through a mobile communication network, an Internet network, or a local area network wireless communication network (NFC, wireless-fidelity (Wi-Fi), MST, or the like).

According to various embodiments of the present disclosure, the electronic device 100 may be a user device that a user wanting to make a payment (or a deposit and withdrawal) uses. The user may make a payment or may make a deposit and withdrawal (or remit money) online or offline by using the electronic device 100.

According to an embodiment, the electronic device 100 may provide a user with a payment service by using a payment application (e.g., Samsung Pay™ Application). According to an embodiment, the payment application may provide a user with a user interface associated with the payment. For example, the payment application may provide a user interface associated with card registration, a payment, or a transaction. Moreover, the payment application may provide, for example, an interface associated with authentication of a user through identification and verification (ID&V).

According to an embodiment, the electronic device 100 may manage card information (or account information) associated with a payment service account (e.g., a Samsung account), a biometric authentication service account, and a user account.

According to an embodiment, the electronic device 100 may authenticate a user through a biometric authentication process. If a payment request from a user is received, the electronic device 100 may perform biometric authentication in conjunction with the authentication server 200.

According to an embodiment, the electronic device 100 may request a payment token from the finance server 400 through the payment server 300. According to an embodiment, the electronic device 100 may make a payment (or a deposit and withdrawal) by using a token issued by the finance server 400.

According to an embodiment, the electronic device 100 may receive a service code from the payment server 300. According to an embodiment, the electronic device 100 may request an available service code from the payment server 300 or may send a use approval request of a designated service code to the payment server 300.

According to an embodiment, the electronic device 100 may generate track data for making a payment or a deposit and withdrawal by using the payment token and the service code. For example, to make a payment by using the MST, the electronic device 100 may change the payment token into the form of track data and may insert the service code in a designated area of the track data. As another example, in the case where the payment token is generated in the form of track data, the electronic device 100 may generate final track data by inserting the service code in the payment token. According to an embodiment, the electronic device 100 may send the track data to the payment device 500 or the deposit and withdrawal device 700 and may make a payment or a deposit and withdrawal by using the track data.

According to an embodiment, the authentication server 200 may authenticate a user in response to the request of the electronic device 100. According to an embodiment, the authentication server 200 may provide a biometric authentication service (e.g., fast identity online (FIDO)) for performing user authentication by using biometric information of a user. According to an embodiment, the authentication server 200 may perform user authentication by using authentication information received from the electronic device 100. According to an embodiment, when the user authentication is completed, the authentication server 200 may send the authentication result to the electronic device 100.

According to an embodiment, the authentication server 200 may manage card information (or account information) associated with a payment service account (e.g., a Samsung account), a biometric authentication service account, and a user account. According to an embodiment, when receiving the biometric authentication checking request associated with the payment information from the finance server 400, the authentication server 200 may check whether to complete the biometric authentication of a user.

According to an embodiment, the payment server 300 may exchange information with the electronic device 100 and the finance server 400. According to an embodiment, the payment server 300 may manage card information (or account information) associated with a payment service account (e.g., a Samsung account), a biometric authentication service account, and a user account. According to an embodiment, the payment server 300 may manage an available service code list for each user that subscribes to a payment service. For example, the service code may mean a code for identifying an additional service provided to a user in a process of making a payment or a deposit and withdrawal.

According to an embodiment, the service code may include a service code used for a payment service and a service code used for a deposit and withdrawal service. For example, the service code used for the payment service may be a code that allows the electronic device 100 to perform at least one of providing an advertisement, issuing a coupon, collecting a point, or discounting a charge. As another example, the service code used for a deposit and withdrawal service may be a code that allows the electronic device 100 to perform at least one of not outputting a receipt, discounting a fee, reducing and exempting a fee, and providing a text service.

According to an embodiment, the service code list may be changed according to the request of a user or the details of a financial service of a user. For example, a user (e.g., a very important person (VIP)) that has a high record of a financial service may use a service code for reducing and exempting a fee, providing a text service, discounting a charge, and the like. As another example, in the case where a user selects an advertisement associated with a specific finance product, the user may use a service code for providing an advertisement. According to an embodiment, if an available service code of a user is changed, the payment server 300 may update the service code list. According to an embodiment, the service code list may be shared with the electronic device 100.

According to an embodiment, if the electronic device 100 requests a payment token, the payment server 300 may send a token request to the finance server 400. According to an embodiment, the payment server 300 may send the token request, which is received from the electronic device 100, to the finance server 400. According to an embodiment, the payment server 300 may send a token, which is received from the finance server 400, to the electronic device 400.

According to an embodiment, if receiving a token request or service code request from the electronic device 100, the payment server 300 may check a service code that is available to a user of the electronic device 100. According to an embodiment, the payment server 300 may send the available service code to the electronic device 100.

According to an embodiment, the payment server 300 may generate track data for making a payment or a deposit and withdrawal by using a payment token and a service code. For example, the payment server 300 may change the payment token into the form of track data and may insert the service code in a designated position of the track data. As another example, in the case where the payment token has the form of track data, the payment server 300 may generate final track data by inserting a service code in the payment token. According to an embodiment, the payment server 300 may send the generated track data to the electronic device 100.

According to an embodiment, if receiving the use request of a service code from the electronic device 100, the payment server 300 may determine whether a user of the electronic device 100 has an authority to use the requested service code. According to an embodiment, if it is determined that the user has the authority, the payment server 300 may send use approval information about the service code to the electronic device 100. If it is determined that the user does not have the authority, the payment server 300 may send use rejection information about the service code to the electronic device 100.

According to an embodiment, the finance server 400 may generate a payment token. According to an embodiment, the finance server 400 may generate a token in the form of track data. According to an embodiment, if receiving a payment token request from the payment server 300, the finance server 400 may check whether user authentication is passed by using the authentication server 200. According to an embodiment, if receiving the result of checking biometric authentication from the authentication server 200, the finance server 400 may generate a token and may send the token to the payment server 300. According to various embodiments of the present disclosure, the token may be generated by a token server independent of the finance server 400 and may be sent to the electronic device 100.

According to an embodiment, the finance server 400 may be a server that a credit card company or a bank operates. According to an embodiment, the finance server 400 may issue a card and may manage card information (or account information) about the card. According to an embodiment, the finance server 400 may receive information about a payment or a deposit and withdrawal from the payment agent server 600 or the deposit and withdrawal device 700 to finally determine whether to approve the payment or the deposit and withdrawal.

According to an embodiment, if receiving information associated with a payment from the payment agent server 600 or the deposit and withdrawal device 700, the finance server 400 may check a service code included in the information associated with the payment to provide a user of the electronic device 100 with a service corresponding to the service code. For example, the finance server 400 may exempt a user from a withdrawal fee or may provide the user with a short message service (SMS) for providing the user with the result of a deposit and withdrawal. As another example, the finance server 400 may collect an additional point in a payment card or may discount a part of the amount of payment when the amount of payment is charged.

If receiving track data from the electronic device 100, the payment device 500 may send information associated with a payment, which is included in track data, to the payment agent server 600. According to an embodiment, the information associated with the payment may include payment information (e.g., a token), a token validity period, a service code, and encryption information (e.g., cryptogram). According to an embodiment, the payment device 500 may be a point of sale (POS) terminal or a card terminal.

The payment agent server 600 may send information associated with a payment (e.g., a service code of payment information and encryption information (e.g., cryptogram)), which is received from the payment device 500, to the finance server 400. According to an embodiment, if receiving information about whether to approve a payment from the finance server 400, the payment agent server 600 may send the information to the payment server 300 and the payment device 500.

If receiving track data from the electronic device 100, the deposit and withdrawal device 700 may send information associated with a deposit and withdrawal, which is included in the track data, to the finance server 400. According to an embodiment, the information associated with the deposit and withdrawal may include a deposit and withdrawal account, the amount of deposit and withdrawal, a token validity period, a service code, and encryption information. According to an embodiment, the deposit and withdrawal device 700 may be an automated teller machine (ATM).

Figure 2:
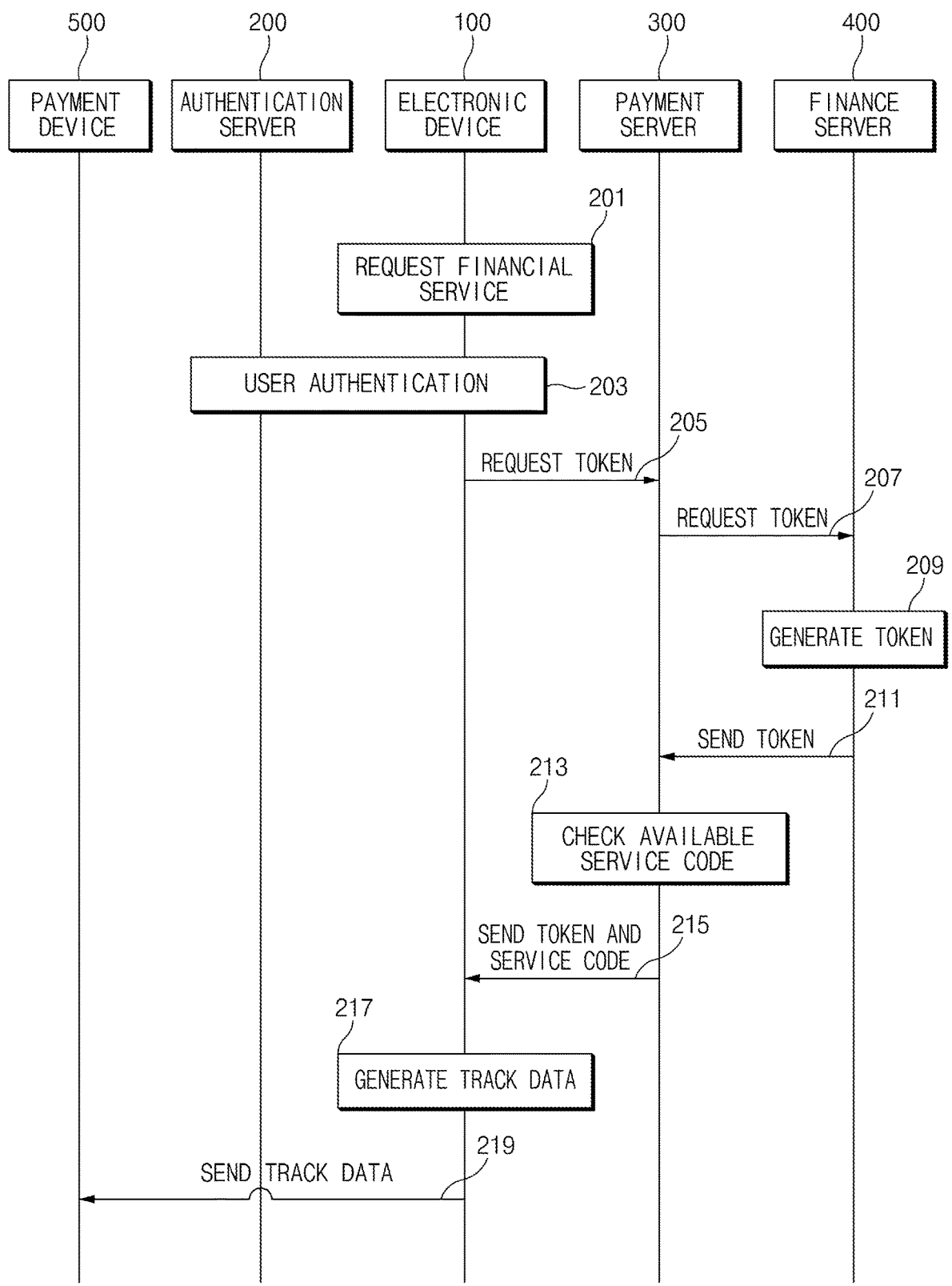
FIG. 2 is a diagram illustrating a payment method of a payment system according to an embodiment of the present disclosure.

FIG. 2 is a diagram illustrating a payment method of a payment system according to an embodiment of the present disclosure.

A flowchart illustrated in FIG. 2 may denote an operation in which the payment system uses a disposable token (e.g., one time card (OTC)) or in which the payment system makes a payment after receiving a token, which can be repeatedly used, for the first time.

Referring to FIG. 2, in operation 201, a user of the electronic device 100 may request a financial service. For example, the electronic device 100 may receive a payment command or a deposit and withdrawal command from a user through a user interface provided at a payment application installed in the electronic device 100.

In operation 203, the electronic device 100 and the authentication server 200 may authenticate a user. According to an embodiment, if the financial service is requested, the electronic device 100 may perform biometric authentication by using a biometric authentication module. The biometric authentication may be an authentication method using the biometric information of the user and may include, for example, a fingerprint authentication, an iris authentication, a face authentication, a voice authentication, or the like. For example, the electronic device 100 may perform biometric authentication by recognizing the biometric information of the user and comparing the recognized biometric information with the previously registered biometric information. According to an embodiment, if there is no registered biometric information, the electronic device 100 may perform a process of registering biometric information of the user. According to an embodiment, the electronic device 100 may send authentication information to the authentication server 200 based on the biometric authentication. The authentication information may be, for example, information in which specific data is encrypted (or specific data includes an electronic signature) by using a private key included in the electronic device 100. According to an embodiment, the authentication server 200 may perform user authentication by using authentication information received from the electronic device 100 and may send the authentication result to the electronic device 100.

In operation 205, the electronic device 100 may request a token from the payment server 300. According to an embodiment, the token request may include at least one of user information (e.g., a user account), payment information (e.g., a card number), or deposit and withdrawal information (e.g., an account number). In operation 207, the payment server 300 may request a token from the finance server 400.

In operation 209, the finance server 400 may generate the token. According to an embodiment, the token may be used when a user makes a payment or a deposit and withdrawal and may include card information (e.g., a primary account number (PAN)) or a value for replacing account information. According to an embodiment, the finance server 400 may generate the token in the form of track data.

According to an embodiment, before generating the token, the finance server 400 may check whether the user authentication is passed, through the authentication server 200. For example, the finance server 400 may request the authentication server 200 to check whether the user authentication is passed and may receive the received result. According to an embodiment, if the user authentication is checked, the finance server 400 may generate the token.

In operation 211, the finance server 400 may send the token to the payment server 300. According to an embodiment, the finance server 400 may encrypt the token and may send the encrypted token to the payment server 300.

In operation 213, the payment server 300 may check a service code that is available to a user of the electronic device 100. According to an embodiment, the payment server 300 may manage an available service code list for each user. According to an embodiment, the payment server 300 may check the service code, which is available to a user, by using the service code list.

According to an embodiment, the payment server 300 may check the available service code based on a kind of financial service request inputted to the electronic device 100. For example, if the electronic device 100 requests a token for making a payment, the payment server 300 may check a service code used for the payment. As another example, if the electronic device 100 requests a token for making a deposit and withdrawal, the payment server 300 may check a service code used for the deposit and withdrawal. According to an embodiment, the payment server 300 may determine whether the token request is a token request for making a payment or a token request for making a deposit and withdrawal, by using information included in the token request received from the electronic device 100.

In operation 215, the payment server 300 may send the token and a service code, which is available to a user, to the electronic device 100.

In operation 217, the electronic device 100 may generate track data by using the token and the service code received from the payment server 300. For example, the electronic device 100 may change a payment token in the form of track data and may insert the service code in a designated position of the track data. As another example, in the case where a payment token has the form of track data, the electronic device 100 may generate the final track data by inserting the service code in the payment token.

According to an embodiment, the electronic device 100 may generate different track data based on a kind of financial service that a user requests. For example, in the case where a user requests a payment service, the electronic device 100 may generate first track data (e.g., track 2 data). In the case where a user requests a deposit and withdrawal service, the electronic device 100 may generate second track data (e.g., track 3 data).

According to an embodiment, before generating the track data, the electronic device 100 may ask a user about whether to use a service code. For example, the electronic device 100 may provide an available service code list through a user interface provided at a payment application. The user may select whether to use the service code through the user interface.

According to an embodiment, in the case where a payment system uses a token that can be repeatedly used, the electronic device 100 may store the received token in a memory.

In operation 219, the electronic device 100 may send the track data to the payment device 500. According to an embodiment, in the case where the financial service that a user requests is a deposit and withdrawal service, the electronic device 100 may send the track data to the deposit and withdrawal device 700. According to an embodiment, the electronic device 100 may send the track data by using an MST module.

In an embodiment described with reference to FIG. 2, the electronic device 100 is described as generating the track data. However, an embodiment of the inventive concept is not limited thereto. For example, the payment server 300 may generate the track data.

According to an embodiment, if operation 213 is completed, the payment server 300 may generate the track data by using the token and the checked service code received from the finance server 400. According to an embodiment, the payment server 300 may generate different track data based on a kind of financial service that a user requests. For example, in the case where a user requests a payment service, the payment server 300 may generate first track data (e.g., track 2 data). In the case where a user requests a deposit and withdrawal service, the electronic device 100 may generate second track data (e.g., track 3 data).

If generating the track data, the payment server 300 may send the track data to the electronic device 100. That is, in operation 215, the payment server 300 may send the track data, not a token and a service code.

If receiving the track data from the payment server 300, the electronic device 100 may omit an operation of generating the track data and may send the received track data to the payment device 500.

Figure 3:
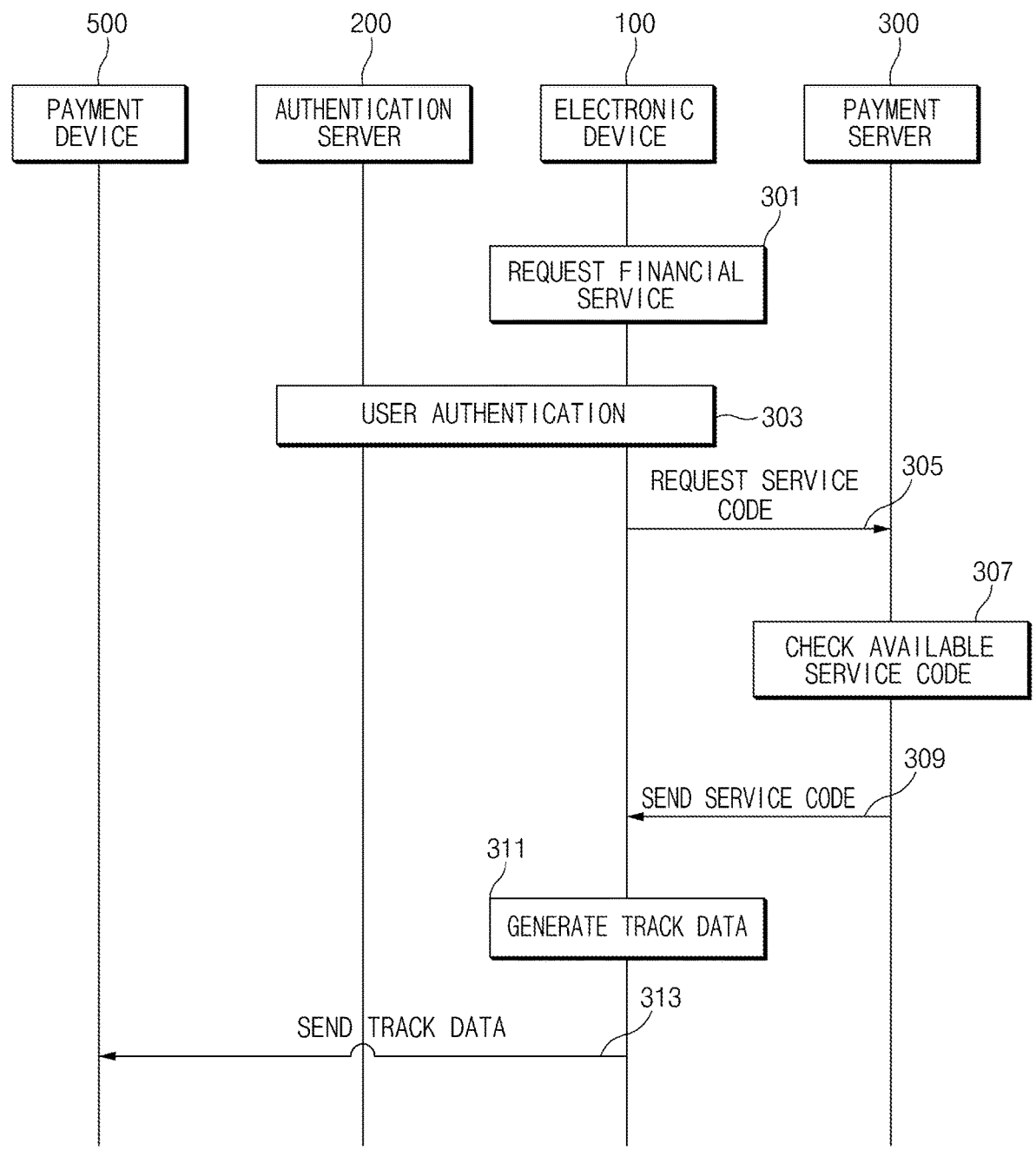
FIG. 3 is a diagram illustrating a payment method of a payment system according to an embodiment of the present disclosure.

FIG. 3 is a diagram illustrating a payment method of a payment system according to an embodiment of the present disclosure.

The flowchart illustrated in FIG. 3 may mean that an electronic device requests a service code from the payment server 300 and then makes a payment while storing a token.

Referring to FIG. 3, in operation 301, a user of the electronic device 100 may request a financial service. For example, the electronic device 100 may receive a payment command or a deposit and withdrawal command from a user through a user interface provided at a payment application installed in the electronic device 100.

In operation 303, the electronic device 100 and the authentication server 200 may authenticate a user. According to an embodiment, if the financial service is requested, the electronic device 100 may perform biometric authentication by using biometric authentication module. The biometric authentication may be an authentication method using the biometric information of the user and may include, for example, a fingerprint authentication, an iris authentication, a face authentication, a voice authentication, or the like. For example, the electronic device 100 may perform biometric authentication by recognizing the biometric information of the user and comparing the recognized biometric information with the previously registered biometric information. According to an embodiment, if there is no registered biometric information, the electronic device 100 may perform a process of register biometric information of the user. According to an embodiment, the electronic device 100 may send authentication information to the authentication server 200 based on the biometric authentication. The authentication information may be, for example, information in which specific data is encrypted (or specific data includes an electronic signature) by using a private key included in the electronic device 100. According to an embodiment, the authentication server 200 may perform user authentication by using authentication information received from the electronic device 100 and may send the authentication result to the electronic device 100.

In operation 305, the electronic device 100 may request a service code from the payment server 300. According to an embodiment, the request of the service code may include at least one of user information (e.g., user account), payment information (e.g., card number), or deposit and withdrawal information (e.g., account number).

In operation 307, the payment server 300 may check a service code that is available to a user of the electronic device 100. According to an embodiment, the payment server 300 may manage an available service code list for each user. According to an embodiment, the payment server 300 may check the service code, which is available to a user, by using the service code list.

According to an embodiment, before checking the service code, the payment server 300 may check whether the user authentication is passed, through the authentication server 200. For example, the payment server 300 may request the authentication server 200 to check whether the user authentication is passed and may receive the received result. According to an embodiment, if the user authentication is checked, the payment server 300 may check an available service code.

According to an embodiment, the payment server 300 may check the service code based on a kind of financial service inputted to the electronic device 100. For example, if a payment request is inputted to the electronic device 100, the payment server 300 may select a service code used for a payment. As another example, if a deposit and withdrawal service is requested from the electronic device 100, the payment server 300 may select a service code used for a deposit and withdrawal. According to an embodiment, the payment server 300 may determine whether the token request is a token request for making a payment or a token request for making a deposit and withdrawal, by using information included in the service code request received from the electronic device 100.

In operation 309, the payment server 300 may send a service code, which is available to a user, to the electronic device 100.

In operation 311, the electronic device 100 may generate track data by using the token stored in a memory and the service code received from the payment server 300. According to an embodiment, the electronic device 100 may generate different track data based on a kind of financial service that a user requests. For example, in the case where a user requests a payment service, the electronic device 100 may generate first track data (e.g., track 2 data). In the case where a user requests a deposit and withdrawal service, the electronic device 100 may generate second track data (e.g., track 3 data).

According to an embodiment, before generating the track data, the electronic device 100 may ask a user about whether to use a service code. For example, the electronic device 100 may provide an available service code list through a user interface provided at a payment application. The user may select whether to use the service code through the user interface.

In operation 313, the electronic device 100 may send the track data to the payment device 500. According to an embodiment, in the case where the financial service that a user requests is a deposit and withdrawal service, the electronic device 100 may send the track data to the deposit and withdrawal device 700. According to an embodiment, the electronic device 100 may send the track data by using an MST module.

Figure 4:
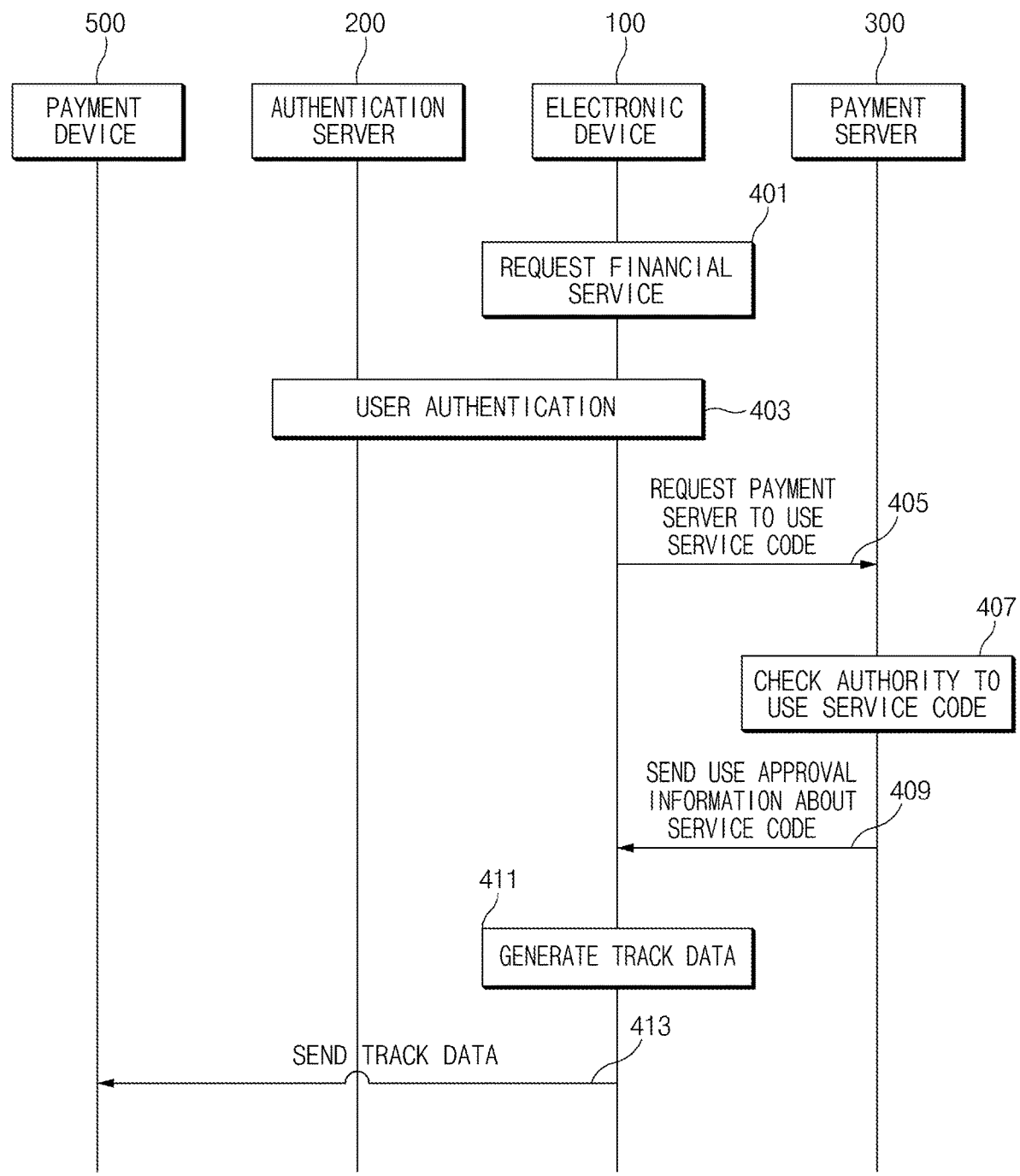
FIG. 4 is a diagram illustrating a payment method of a payment system according to an embodiment of the present disclosure.

FIG. 4 is a diagram illustrating a payment method of a payment system according to embodiment of the present disclosure.

The flowchart illustrated in FIG. 4 may mean that an electronic device requests the use approval of a service code from the payment server 300 and then makes a payment while storing an available service code list.

Referring to FIG. 4, in operation 401, a user of the electronic device 100 may request a financial service. For example, the electronic device 100 may receive a payment command or a deposit and withdrawal command from a user through a user interface provided at a payment application installed in the electronic device 100.

In operation 403, the electronic device 100 and the authentication server 200 may authenticate a user. According to an embodiment, if the user requests the financial service, the electronic device 100 may perform biometric authentication by using a biometric authentication module. The biometric authentication may be an authentication method using the biometric information of a user and may include, for example, a fingerprint authentication, an iris authentication, a face authentication, a voice authentication, or the like. For example, the electronic device 100 may perform biometric authentication by recognizing the biometric information of the user and comparing the recognized biometric information with the previously registered biometric information. According to an embodiment, if there is no registered biometric information, the electronic device 100 may perform a process of register biometric information of the user. According to an embodiment, the electronic device 100 may send authentication information to the authentication server 200 based on the biometric authentication. The authentication information may be, for example, information in which specific data is encrypted (or specific data includes an electronic signature) by using a private key included in the electronic device 100. According to an embodiment, the authentication server 200 may perform user authentication by using authentication information received from the electronic device 100 and may send the authentication result to the electronic device 100.

In operation 405, the electronic device 100 may request the payment server 300 to use a service code. According to an embodiment, the use request of the service code may include at least one of user information (e.g., a user account), payment information (e.g., a card number), or deposit and withdrawal information (e.g., an account number).

According to an embodiment, the electronic device 100 may request the payment server 300 to use the service code, which is selected by a user, from among available service codes. According to an embodiment, a user may select at least a part of an available service code list through a user interface provided at a payment application of the electronic device 100. According to an embodiment, the electronic device 100 may select different service code based on a kind of requested financial service. For example, if a payment request is inputted to the electronic device 100, the payment server 300 may provide a user interface for selecting a service code used for a payment. As another example, if a deposit and withdrawal service is requested from the electronic device 100, the payment server 300 may provide a user interface for selecting a service code used for a deposit and withdrawal by the user.

In operation 407, the payment server 300 may check an authority to use the service code that the payment server 300 is requested to use. According to an embodiment, the payment server 300 may manage an available service code list for each user. According to an embodiment, the payment server 300 may check the service code, which is available to a user, by using the service code list.

According to an embodiment, before checking the authority to use the service code, the payment server 300 may check whether the user authentication is passed, through the authentication server 200. For example, the payment server 300 may request the authentication server 200 to check whether the user authentication is passed and may receive the received result. According to an embodiment, if the user authentication is passed, the payment server 300 may check the authority to use the service code.

According to an embodiment, in operation 409, if it is determined that the user has the authority, the payment server 300 may send use approval information about the service code to the electronic device 100. As another example, if it is determined that the user does not have the authority, the payment server 300 may send use rejection information about the service code to the electronic device 100.

In operation 411, the electronic device 100 may generate track data by using the token stored in a memory and the service code that the payment server 300 approves of using. According to an embodiment, the electronic device 100 may generate different track data based on a kind of financial service that a user requests. For example, in the case where a user requests a payment service, the electronic device 100 may generate first track data (e.g., track 2 data). In the case where a user requests a deposit and withdrawal service, the electronic device 100 may generate second track data (e.g., track 3 data).

In operation 413, the electronic device 100 may send the track data to the payment device 500. According to an embodiment, in the case where the financial service that a user requests is a deposit and withdrawal service, the electronic device 100 may send the track data to the deposit and withdrawal device 700. According to an embodiment, the electronic device 100 may send the track data by using an MST module.

Figure 5:
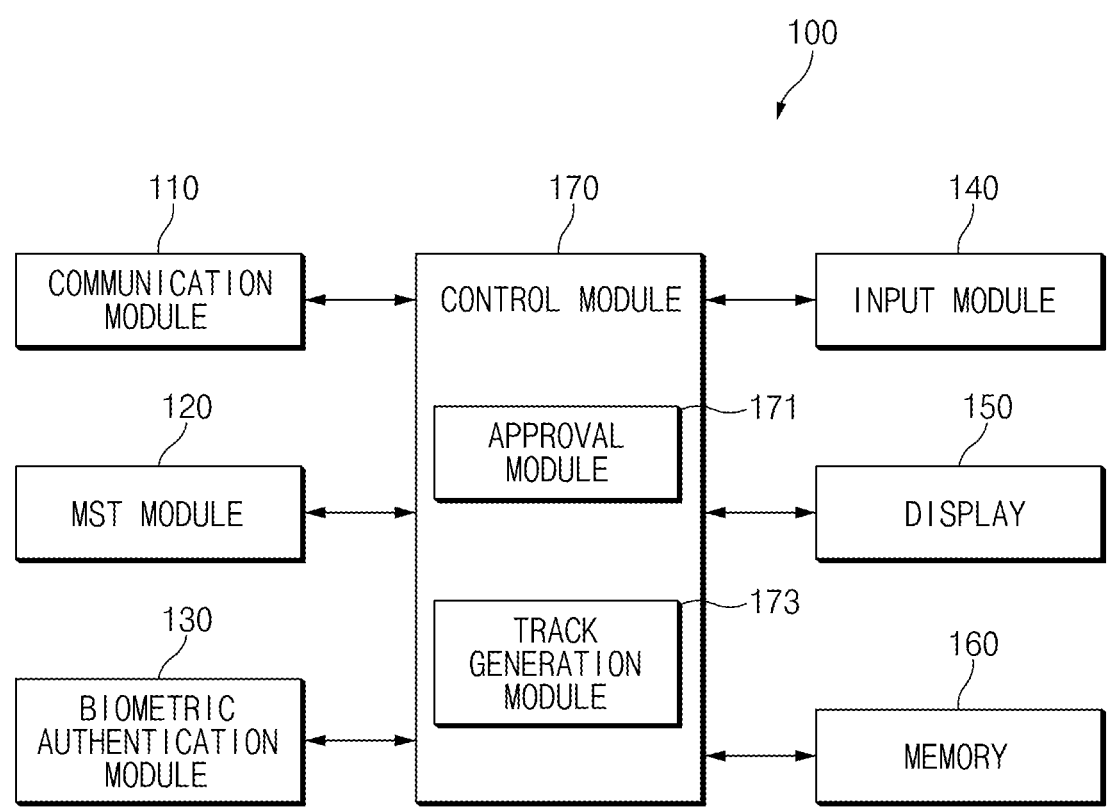
FIG. 5 is a block diagram illustrating a configuration of an electronic device according to an embodiment of the present disclosure.

FIG. 5 is a block diagram illustrating a configuration of an electronic device according to an embodiment of the present disclosure.

Referring to FIG. 5, the electronic device 100 may include a communication module 110, an MST module 120, a biometric authentication module 130, an input module 140, a display 150, a memory 160, and a control module 170.

The communication module 110 may communicate with an external device. According to an embodiment, the communication module 110 may exchange information associated with a payment with an external device (e.g., the authentication server 200, the payment server 300, or the like). According to an embodiment, the communication module 110 may send and receive data through a network (e.g., a mobile communication network or an Internet network). According to an embodiment, the communication module 110 may include a cellular module, a Wi-Fi module, a Bluetooth module, an NFC module, an MST module, a global navigation satellite system (GNSS) module, and the like.

The MST module 120 may send information by using an MST communication technology. According to an embodiment, the MST module 120 may send track data to the payment device 500 and the deposit and withdrawal device 700 supporting a magnetic card. According to an embodiment, the track data may include information associated with a payment or information associated with a deposit and withdrawal. According to an embodiment, the information associated with the payment may include payment information (e.g., a token), a token validity period, a service code, and encryption information (e.g., cryptogram). According to an embodiment, the information associated with the deposit and withdrawal may include a deposit and withdrawal account, the amount of deposit and withdrawal, a token validity period, a service code, and encryption information.

The biometric authentication module 130 may recognize biometric information (e.g., a fingerprint, an iris, a face, a voice, or the like) of a user and may authenticate a user by using the biometric information. According to an embodiment, the biometric authentication module 130 may include a fingerprint authentication module, an iris authentication module, a face authentication module and a voice (or sound) authentication module.

The input module 140 may receive a user command. According to an embodiment, the input module 140 may receive a user command for requesting a financial service. For example, the input module 140 may receive the request of a payment associated with a product transaction or the request of a deposit and withdrawal. According to an embodiment, the input module 140 may receive a user command for selecting a service code. For example, if receiving an available service code from the payment server 300, the input module 140 may receive whether to use a corresponding service code, from a user. According to an embodiment, the input module 140 may receive a user command for requesting the use of the service code.

In an embodiment, the input module 140 may include a touch sensor panel sensing a touch manipulation of a user or a pen sensor panel sensing a pen manipulation of a user. According to an embodiment, the input module 140 may sense a user manipulation inputted by a user with the user's finger or a pen spaced apart from a panel by a specific distance, as well as a user manipulation inputted when the user directly makes contact with the panel (e.g., a touch sensor panel or a pen sensor panel).

The display 150 may display a user interface. According to an embodiment, the display 150 may display a user interface that a payment application provides. A user may input the request of a financial service through a user interface displayed on the display 150. According to an embodiment, the display 150 may display an available service code list. A user may select whether to use the service code by using the service code list displayed on the display 150 or may request the use of the service code.

According to an embodiment, the input module 140 and the display 150, for example, may be implemented with a touch screen that is capable of displaying and sensing the touch manipulation at the same time. In the touch screen, the touch sensor panel may be disposed on the display panel.

The memory 160 may store information associated with a financial service. According to an embodiment, the memory 160 may store card information (or account information) associated with a payment service account (e.g., a Samsung account), a biometric authentication service account, and a user account. According to an embodiment, the memory 160 may store a token used for a payment or a deposit and withdrawal. According to an embodiment, the memory 160 may store an available service code list. According to an embodiment, a service code may include a service code used for a payment service and a service code used for a deposit and withdrawal service. For example, the service code used for the payment service may be a code that allows the electronic device 100 to perform at least one of providing an advertisement, issuing a coupon, collecting a point, or discounting a charge. As another example, the service code used for a deposit and withdrawal service may be a code that allows the electronic device 100 to perform at least one of not outputting a receipt, discounting a fee, reducing and exempting a fee, and providing a text service.

According to an embodiment, the memory 160 may include various memories that are capable of storing security information such as an embedded secure element (eSE), an embedded subscriber identity module (eSIM), a trusted execution environment (TEE), an advanced security secure digital card (ASSD), or the like. The TEE may be, for example, a memory included in the control module 170 and may correspond to a memory area that is accessed when the control module 170 operates in a security mode.

The control module 170 may control an overall operation of the electronic device 100. According to an embodiment, the control module 170 may provide a user with a financial service according to various embodiments by controlling the communication module 110, the MST module 120, the biometric authentication module 130, the input module 140, the display 150, and the memory 160, respectively.

According to an embodiment, the control module 170 (e.g., an AP) may be implemented with a system on chip (SoC) including a processor (or a CPU), a graphic processing unit (GPU), a video process, a memory, and the like.

According to an embodiment, the control module 170 may include an approval module 171 and a track generation module 173. Each of the approval module 171 and the track generation module 173 may be a program module that is executed by the control module 170 and performs a designated operation.

According to an embodiment, if a user requests a payment, the approval module 171 may perform biometric authentication. For example, if a user requests a financial service, the approval module 171 may authenticate a user in conjunction with the authentication server 200. For example, if receiving the request of authentication information, the approval module 171 may activate the biometric authentication module 130 and may perform biometric authentication. According to an embodiment, if the biometric authentication is completed, the approval module 171 may send authentication information to the authentication server 200, and the authentication server 200 may perform user authentication.

According to an embodiment, if a user requests a financial service, the approval module 171 may request a token from the payment server 300. According to an embodiment, the token request may include at least one of user information (e.g., a user account), payment information (e.g., a card number), or deposit and withdrawal information (e.g., an account number). According to an embodiment, if the user authentication is completed, the approval module 171 may request a token from the payment server 300. For example, in the case where a payment system uses a disposable token (e.g., OTC) or where the payment system receives a token, which can be repeatedly used, for the first time (that is, in the case where a token is not stored in the memory 160), the approval module 171 may request a token to the payment server 300.

According to an embodiment, the approval module 171 may request a token corresponding to a kind of financial service that a user requests. For example, in the case where a user requests a payment service, the approval module 171 may request a token associated with a payment service. In the case where a user requests a deposit and withdrawal service, the approval module 171 may request a token associated with a deposit and withdrawal service.

According to an embodiment, the approval module 171 may request a token based on data received from an external device. For example, if specific data is received from the payment device 500 with the electronic device 100 placed around the payment device 500, the electronic device 100 may request a token associated with a payment service. As another example, if specific data is received from the deposit and withdrawal device 700 with the electronic device 100 placed around the deposit and withdrawal device 700, the electronic device 100 may request a token associated with a deposit and withdrawal service.

According to an embodiment, if the token is received from the payment server 300, the approval module 171 may store the received token to the memory 160. According to an embodiment, if the token that can be repeatedly used is received from the payment server 300, the approval module 171 may store the received token to the memory 160. According to an embodiment, the token may be issued and managed for each card or for each account.

According to an embodiment, if a financial service is requested from a user, the approval module 171 may request a service code to the payment server 300. For example, in the case where an available token is stored in the memory 160, the approval module 171 may request only the service code to the payment server 300. According to an embodiment, the request of the service code may include at least one of user information (e.g., a user account), payment information (e.g., a card number), or deposit and withdrawal information (e.g., an account number).

According to an embodiment, if a user requests the use of a service code, the approval module 171 may request the use approval of the service code from the payment server 300. According to an embodiment, if a user requests a financial service, the approval module 171 may display a user interface for selecting an available service code list on the display 150. According to an embodiment, if a service code is selected by a user, the approval module 171 may request the use approval of the selected service code from the payment server 300.

According to an embodiment, the track generation module 173 may generate track data by using the token and the service code. For example, the track generation module 173 may generate the track data by using the token and the service code received from the payment server 300. As another example, the track generation module 173 may generate the track data by using the token stored in the memory 160 and the service code received from the payment server 300.

According to an embodiment, the track generation module 173 may generate different track data based on a kind of financial service that a user requests. For example, in the case where a user requests a payment service, the track generation module 173 may generate first track data (e.g., track 2 data). In the case where a user requests a deposit and withdrawal service, the electronic device 100 may generate second track data (e.g., track 3 data).

According to an embodiment, the approval module 171 may generate different track data based on data received from an external device. For example, if specific data is received from the payment device 500 with the electronic device 100 placed around the payment device 500, the electronic device 100 may generate the first track data associated with a payment service. As another example, if specific data is received from the deposit and withdrawal device 700 with the electronic device 100 placed around the deposit and withdrawal device 700, the electronic device 100 may generate the second track data associated with a deposit and withdrawal service.

According to an embodiment, the track generation module 173 may insert different service codes in the track data based on a kind of financial service (or a kind of track data) that a user requests. For example, in the case where a user requests a payment service, the track generation module 173 may insert a service code used for a payment in the first track data. As another example, in the case where a user requests a deposit and withdrawal service, the track generation module 173 may insert a service code used for a deposit and withdrawal in the second track data.

According to an embodiment, the control module 170 may send the generated track data to the payment device 500 or the deposit and withdrawal device 700 through the MST module 120.

FIGS. 6A and 6B are views of track data according to various embodiments of the present disclosure.

FIG. 6A may represent first track data, and FIG. 6B may represent second track data.

Referring to FIG. 6A, the first track data may include payment information such as a token number, a token validity period, a payment code, and the like. The token number may include, for example, a number for replacing a card number (e.g., PAN). The token validity period may denote a period during which a token is used and may be set when the token is issued by the finance server 400. The payment code may include, for example, information for distinguishing a kind of payment service such as a payment, a payment cancel, or the like.

According to an embodiment, the first track data may include a service code in a designated area. According to an embodiment, the service code may be expressed by two decimal digits (or hexadecimal). For example, the service code may be inserted in the $25^{th}$ and $26^{th}$ positions of the first track data.

Referring to FIG. 6B, the second track data may include deposit and withdrawal information such as an account number, the amount of deposit and withdrawal, money unit, and the like. According to an embodiment, the second track data may include a service code. According to an embodiment, the service code may be expressed by two decimal digits (or hexadecimal). For example, the service code may be inserted in the $90^{th}$ and $91^{st}$ positions of the second track data.

Figure 7:
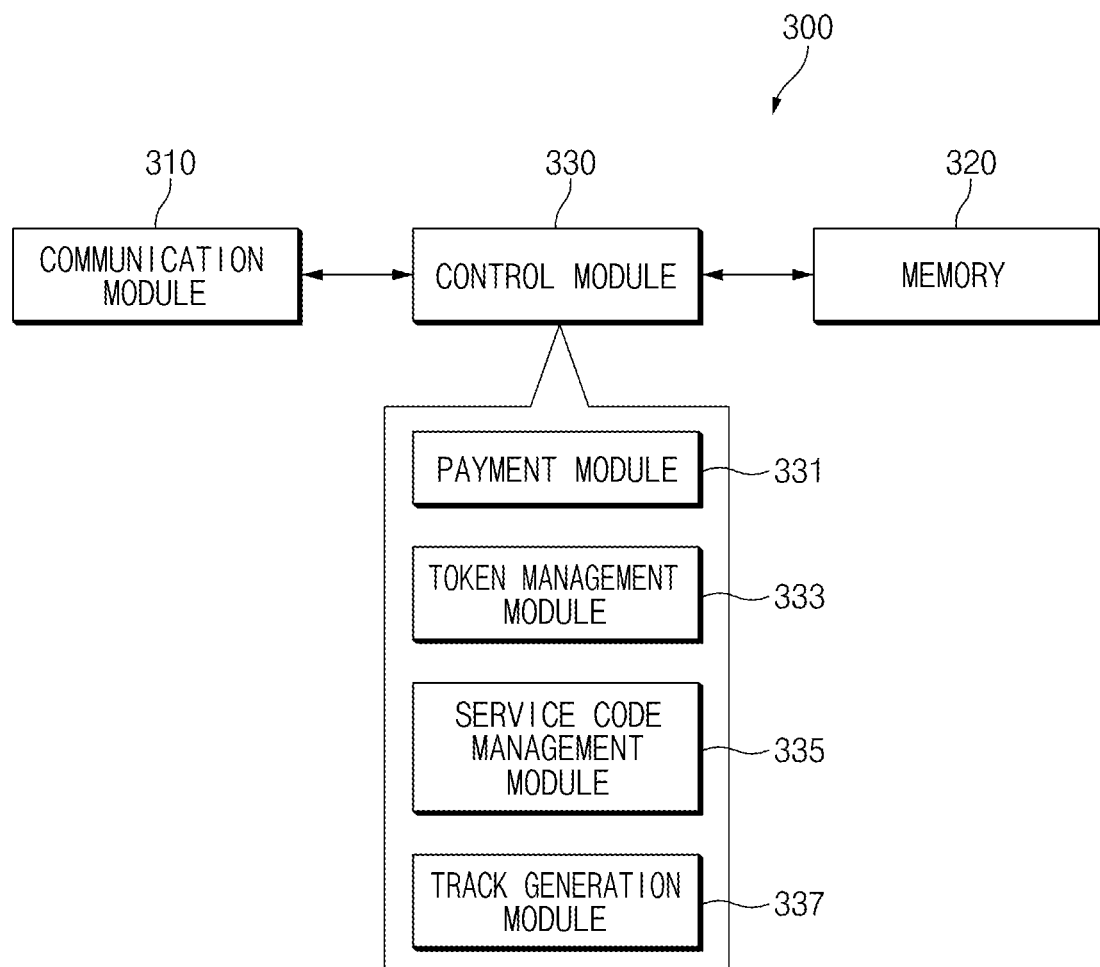
FIG. 7 is a block diagram illustrating a configuration of a payment server according to an embodiment of the present disclosure.

FIG. 7 is a block diagram illustrating a configuration of a payment server according to an embodiment of the present disclosure.

Referring to FIG. 7, the payment server 300 may include a communication module 310, a memory 320, and a control module 330.

The communication module 310 may communicate with an external device. According to an embodiment, the communication module 310 may exchange information associated with a payment or a deposit and withdrawal with an external device (e.g., the electronic device 100, the finance server 400, or the like). According to an embodiment, the communication module 310 may send and receive data through a network (e.g., a mobile communication network or an Internet network).

The memory 320 may store information associated with a financial service. According to an embodiment, the memory 320 may store card information (or account information) associated with a payment service account (e.g., a Samsung account), a biometric authentication service account, and a user account. According to an embodiment, the memory 320 may store an available service code list for each user that subscribes to a payment service. According to an embodiment, a service code may include a service code used for a payment service and a service code used for a deposit and withdrawal service.

The control module 330 may control an overall operation of the payment server 300. According to an embodiment, the control module 330 may include a payment module 331, a token management module 333, and a service code management module 335. The payment module 331, the token management module 333 and the service code management module 335 may be a program module executed by the control module 330 and performs a designated operation.

According to an embodiment, the payment module 331 may be functionally connected with a payment application included in the electronic device 100 to exchange information associated with a payment or a deposit and withdrawal. According to an embodiment, if a payment is completed, the payment module 331 may store and manage information of a payment result, the details of a payment, a payment record, and the like. According to an embodiment, the payment module 331 may manage a payment service account, card information (or account information), and the like stored in the memory 320.

According to an embodiment, the token management module 333 may be functionally connected with the finance server 400 to perform at least one of issuing, deleting, or activating of a token. According to an embodiment, the token management module 333 may send a token request, which is received from the electronic device 100, to the finance server 400 (or a token server) and may send a response (e.g., a token) of a request, which is received from the finance server 400 (or the token server), to the electronic device 100.

According to an embodiment, the service code management module 335 may manage an available service code list for each user that subscribes to a payment service. According to an embodiment, the service code management module 335 may update a service code list based on the request of a user or the details of a financial service of a user. According to an embodiment, the service code list may be shared with the electronic device 100.

According to an embodiment, if receiving a token request or service code request from the electronic device 100, the service code management module 335 may check a service code that is available to a user of the electronic device 100 and may send the available service code to the electronic device 100.

According to an embodiment, if receiving the use request of a service code from the electronic device 100, the service code management module 335 may determine whether a user of the electronic device 100 has an authority to use the requested service code. According to an embodiment, if it is determined that the user have the authority, the service code management module 335 may send use approval information about the service code to the electronic device 100. If it is determined that the user does not have the authority, the service code management module 335 may send use rejection information about the service code to the electronic device 100.

A track generation module 337 may generate track data. According to an embodiment, the track generation module 337 may generate the track data by using the token received from the finance server 400 and the checked service code. According to another embodiment, the track generation module 337 may generate the track data by using the token and the service code received from the electronic device 100. According to an embodiment, the track generation module 337 may generate different track data based on a kind of financial service that a user requests. For example, in the case where a user requests a payment service (that is, in the case where the electronic device 100 requests a token for a payment service), the track generation module 337 may generate first track data (e.g., track 2 data). In the case where a user requests a deposit and withdrawal service (that is, in the case where the electronic device 100 requests a token for a deposit and withdrawal service), the electronic device 100 may generate second track data (e.g., track 3 data).

Figure 8:
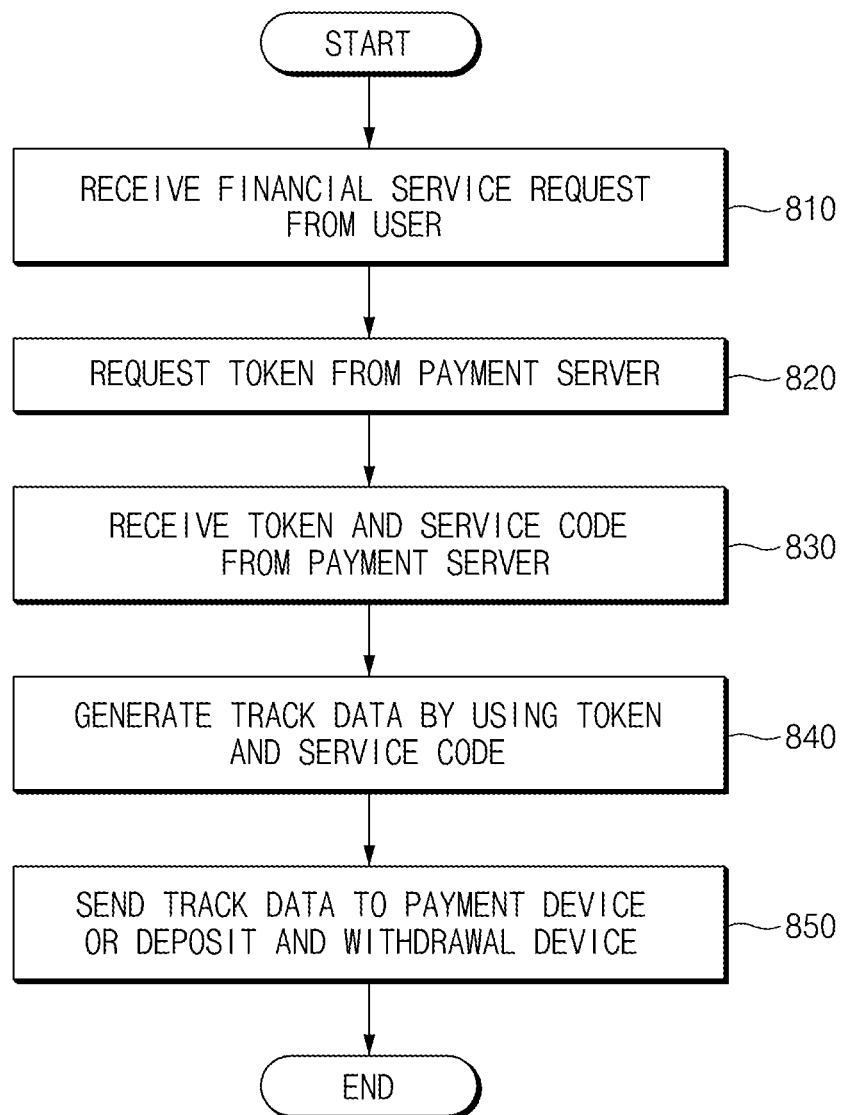
FIG. 8 is a flowchart illustrating a payment method of an electronic device according to an embodiment of the present disclosure.

FIG. 8 is a flowchart illustrating a payment method of an electronic device according to an embodiment of the present disclosure.

The flowchart illustrated in FIG. 8 may include operations that the electronic device 100 illustrated in FIGS. 1, 2, 3, 4 and 5 processes. Therefore, contents described about the electronic device 100 may be applied to the flowchart shown in FIG. 8 with reference to FIGS. 1, 2, 3, 4, and 5 even though there are omitted contents below. A flowchart illustrated in FIG. 8 may denote an operation in which the electronic device uses a disposable token (e.g., OTC) or in which the payment system makes a payment after receiving a token, which can be repeatedly used, for the first time.

Referring to FIG. 8, in operation 810, the electronic device 100 may receive a financial service request from a user. For example, the electronic device 100 may receive a payment command or a deposit and withdrawal command from a user through a user interface provided at a payment application installed in the electronic device 100.

In operation 820, the electronic device 100 may request a token from the payment server 300. According to an embodiment, the token request may include user information (e.g., a user account), payment information (e.g., a card number), or deposit and withdrawal (or remittance) information (e.g., an account number).

According to an embodiment, before requesting a token from the payment server 300, the electronic device 100 may authenticate a user in conjunction with the authentication server 200. For example, if the financial service is requested, the electronic device 100 may perform biometric authentication by using a biometric authentication module. The electronic device 100 may send authentication information to the authentication server 200 based on the biometric authentication and may receive the authentication result from the authentication server 200.

In operation 830, the electronic device 100 may receive a token and a service code from the payment server 300.

In operation 840, the electronic device 100 may generate track data by using the token and the service code received from the payment server 300. According to an embodiment, the electronic device 100 may generate different track data based on a kind of financial service that a user requests. For example, in the case where a user requests a payment service, the electronic device 100 may generate first track data (e.g., track 2 data). In the case where a user requests a deposit and withdrawal service (or a remittance service), the electronic device 100 may generate second track data (e.g., track 3 data).

According to an embodiment, before generating the track data, the electronic device 100 may ask a user about whether to use the service code. For example, the electronic device 100 may provide an available service code list through a user interface provided at a payment application. The user may select whether to use the service code through the user interface.

According to an embodiment, in the case where receiving the token that can be repeatedly used, the electronic device 100 may store the received token in a memory.

In operation 850, the electronic device 100 may send the track data to the payment device 500. According to an embodiment, in the case where the financial service that a user requests is a deposit and withdrawal service (or a remittance service), the electronic device 100 may send the track data to the deposit and withdrawal device 700. According to an embodiment, the electronic device 100 may send the track data by using an MST module.

Figure 9:
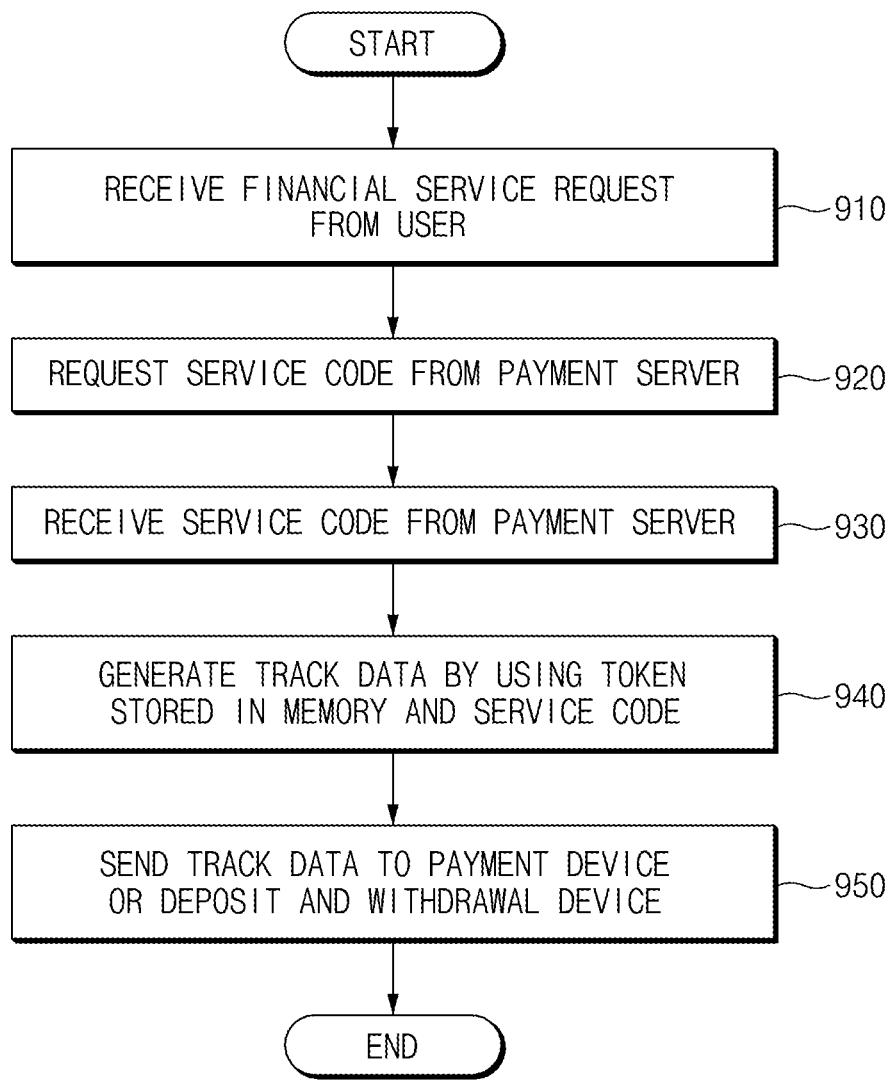
FIG. 9 is a flowchart illustrating a payment method of an electronic device according to an embodiment of the present disclosure.

FIG. 9 is a flowchart illustrating a payment method of an electronic device according to embodiment of the present disclosure.

The flowchart illustrated in FIG. 9 may include operations that the electronic device 100 illustrated in FIGS. 1, 2, 3, 4 and 5 processes. Therefore, contents described about the electronic device 100 may be applied to the flowchart shown in FIG. 9 with reference to FIGS. 1, 2, 3, 4 and 5 even though there are omitted contents below. The flowchart illustrated in FIG. 9 may mean that an electronic device requests a service code from the payment server 300 and then makes a payment while storing a token that can be repeatedly used.

Referring to FIG. 9, in operation 910, the electronic device 100 may receive a financial service request from a user. For example, the electronic device 100 may receive a payment command or a deposit and withdrawal command from a user through a user interface provided at a payment application installed in the electronic device 100.

In operation 920, the electronic device 100 may request a service code from the payment server 300. According to an embodiment, the request of the service code may include user information (e.g., a user account), payment information (e.g., a card number), or deposit and withdrawal information (e.g., an account number).

According to an embodiment, before requesting a service code from the payment server 300, the electronic device 100 may authenticate a user in conjunction with the authentication server 200. For example, when the financial service is requested, the electronic device 100 may perform biometric authentication by using a biometric authentication module. The electronic device 100 may send authentication information to the authentication server 200 based on the biometric authentication and may receive the authentication result from the authentication server 200.

In operation 930, the electronic device 100 may receive the service code from the payment server 300.

In operation 940, the electronic device 100 may generate track data by using the token stored in a memory and the service code received from the payment server 300. According to an embodiment, the electronic device 100 may generate different track data based on a kind of financial service that a user requests. For example, in the case where a user requests a payment service, the electronic device 100 may generate first track data (e.g., track 2 data). In the case where a user requests a deposit and withdrawal service, the electronic device 100 may generate second track data (e.g., track 3 data).

According to an embodiment, before generating the track data, the electronic device 100 may ask a user about whether to use a service code. For example, the electronic device 100 may provide an available service code list through a user interface provided at a payment application. The user may select whether to use the service code through the user interface.

In operation 950, the electronic device 100 may send the track data to the payment device 500. According to an embodiment, in the case where the financial service that a user requests is a deposit and withdrawal service, the electronic device 100 may send the track data to the deposit and withdrawal device 700. According to an embodiment, the electronic device 100 may send the track data by using an MST module.

Figure 10:
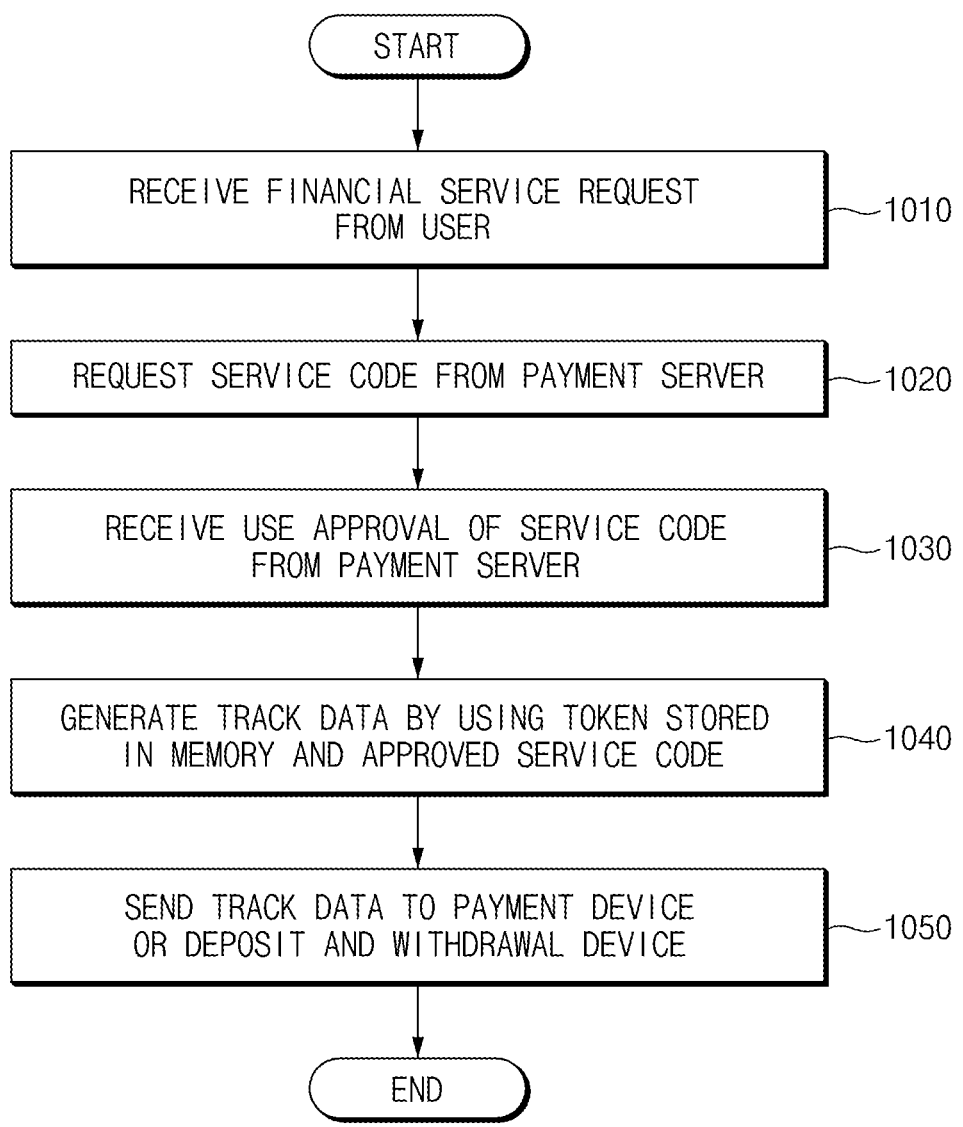
FIG. 10 is a flowchart illustrating a payment method of an electronic device according to an embodiment of the present disclosure.

FIG. 10 is a flowchart illustrating a payment method of an electronic device according to an embodiment of the present disclosure.

The flowchart illustrated in FIG. 10 may include operations that the electronic device 100 illustrated in FIGS. 1, 2, 3, 4 and 5 processes. Therefore, contents described about the electronic device 100 may be applied to the flowchart shown in FIG. 10 with reference to FIGS. 1, 2, 3, 4 and 5 even though there are omitted contents below. The flowchart illustrated in FIG. 10 may mean that an electronic device 100 requests the use approval of a service code from the payment server 300 and then makes a payment while storing an available service code list.

Referring to FIG. 10, in operation 1010, the electronic device 100 may receive a financial service request from a user. For example, the electronic device 100 may receive a payment command or a deposit and withdrawal command from a user through a user interface provided at a payment application installed in the electronic device 100.

In operation 1020, the electronic device 100 may request the payment server 300 to use a service code. According to an embodiment, the use request of the service code may include user information (e.g., a user account), payment information (e.g., a card number), or deposit and withdrawal information (e.g., an account number).

According to an embodiment, the electronic device 100 may send the token and information associated with a payment to the payment server 300. The payment server 300 may determine a service available to a user or an available service (or a service code) that is recommended to the user based on the token and the information associated with a payment and may send the determined service to the electronic device 100.

According to an embodiment, the electronic device 100 may request the payment server 300 to use a service code, which is selected by a user, from among available service codes. According to an embodiment, a user may select at least a part of an available service code list through a user interface provided at a payment application of the electronic device 100. According to an embodiment, the electronic device 100 may select different service codes based on a kind of requested financial service. For example, if a payment request is inputted to the electronic device 100, the payment server 300 may provide a user interface for selecting a service code used for a payment. As another example, if a deposit and withdrawal service is requested from the electronic device 100, the payment server 300 may provide a user interface for selecting a service code used for a deposit and withdrawal by a user.

According to an embodiment, before the service code is requested from the payment server 300, the electronic device 100 may authenticate a user in conjunction with the authentication server 200. For example, if the financial service is requested, the electronic device 100 may perform biometric authentication by using a biometric authentication module. The electronic device 100 may send authentication information to the authentication server 200 based on the biometric authentication and may receive the authentication result from the authentication server 200.

In operation 1030, the electronic device 100 may receive the use approval information about the service code from the payment server 300.

In operation 1040, the electronic device 100 may generate track data by using the token stored in a memory and the service code that the payment server 300 approves of using. According to an embodiment, the electronic device 100 may generate different track data based on a kind of financial service that a user requests. For example, in the case where a user requests a payment service from the electronic device 100, the electronic device 100 may generate first track data (e.g., track 2 data). In the case where a user requests a deposit and withdrawal service from the electronic device 100, the electronic device 100 may generate second track data (e.g., track 3 data).

In operation 1050, the electronic device 100 may send the track data to the payment device 500. According to an embodiment, in the case where the financial service that a user requests is a deposit and withdrawal service, the electronic device 100 may send the track data to the deposit and withdrawal device 700. According to an embodiment, the electronic device 100 may send the track data by using an MST module.

Figure 11:
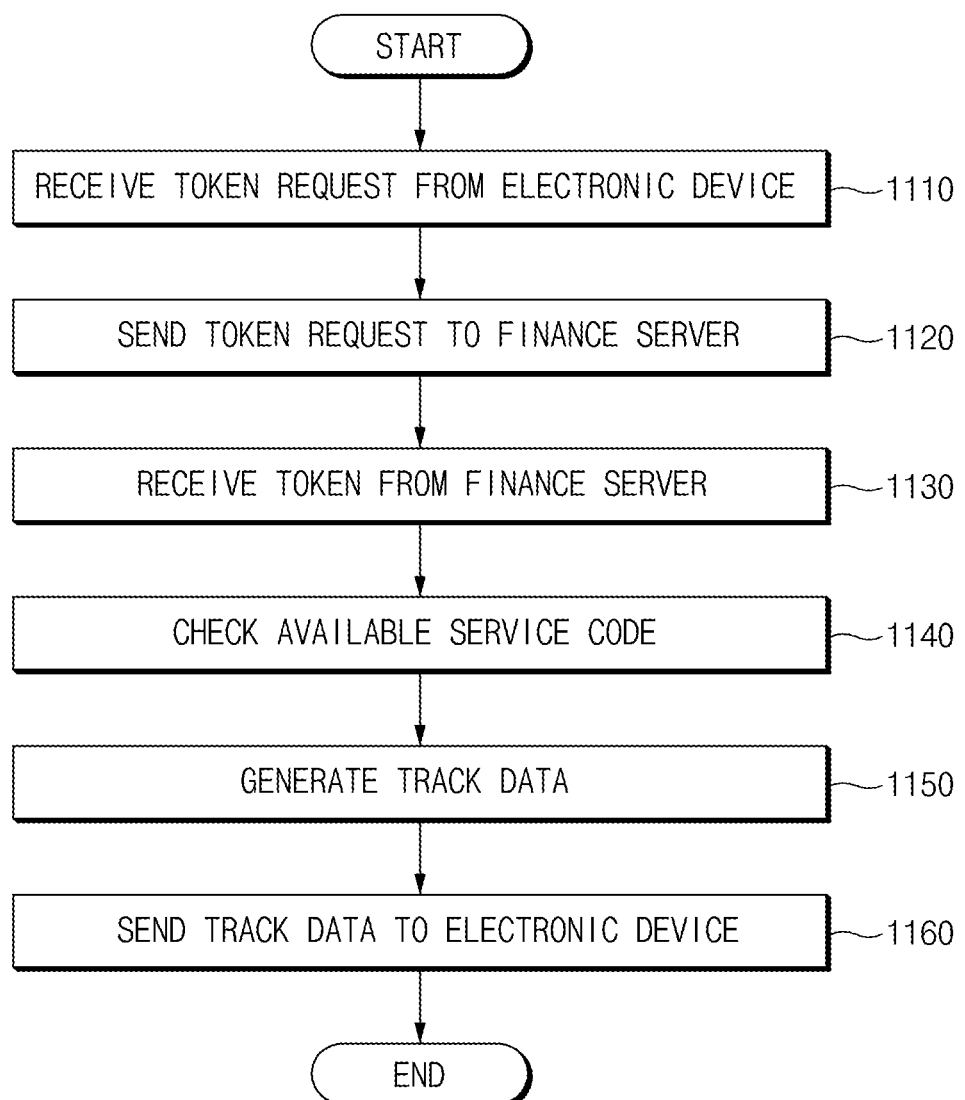
FIG. 11 is a flowchart illustrating a payment method of a payment server according to an embodiment of the present disclosure.

FIG. 11 is a flowchart illustrating a payment method of a payment server according to an embodiment of the present disclosure.

Referring to FIG. 11, in operation 1110, the payment server 300 may receive a token request from the electronic device 100. According to an embodiment, the token request may include user information (e.g., a user account), payment information (e.g., a card number), or deposit and withdrawal information (e.g., an account number).

In operation 1120, the payment server 300 may send the token request to the finance server 400.

In operation 1130, the payment server 300 may receive a token from the finance server 400. According to an embodiment, the payment server 300 may receive an encrypted token from the finance server 400. According to an embodiment, the payment server 300 may decrypt the encrypted token.

In operation 1140, the payment server 300 may check an available service code. According to an embodiment, the payment server 300 may manage an available service code list for each user. According to an embodiment, the payment server 300 may check the service code, which is available to a user, by using the service code list.

In operation 1150, the payment server 300 may generate track data. According to an embodiment, the payment server 300 may generate the track data by using the token and the checked service code received from the finance server 400. According to another embodiment, the payment server 300 may generate the track data by using the token and the service code received from the electronic device 100. According to an embodiment, the track generation module 337 may generate different track data based on a kind of financial service that a user requests. For example, in the case where a user requests a payment service, the payment server 300 may generate first track data (e.g., track 2 data). In the case where a user requests a deposit and withdrawal service, the electronic device 100 may generate second track data (e.g., track 3 data).

In operation 1160, the payment server 300 may send track data to the electronic device 100.

Figure 12:
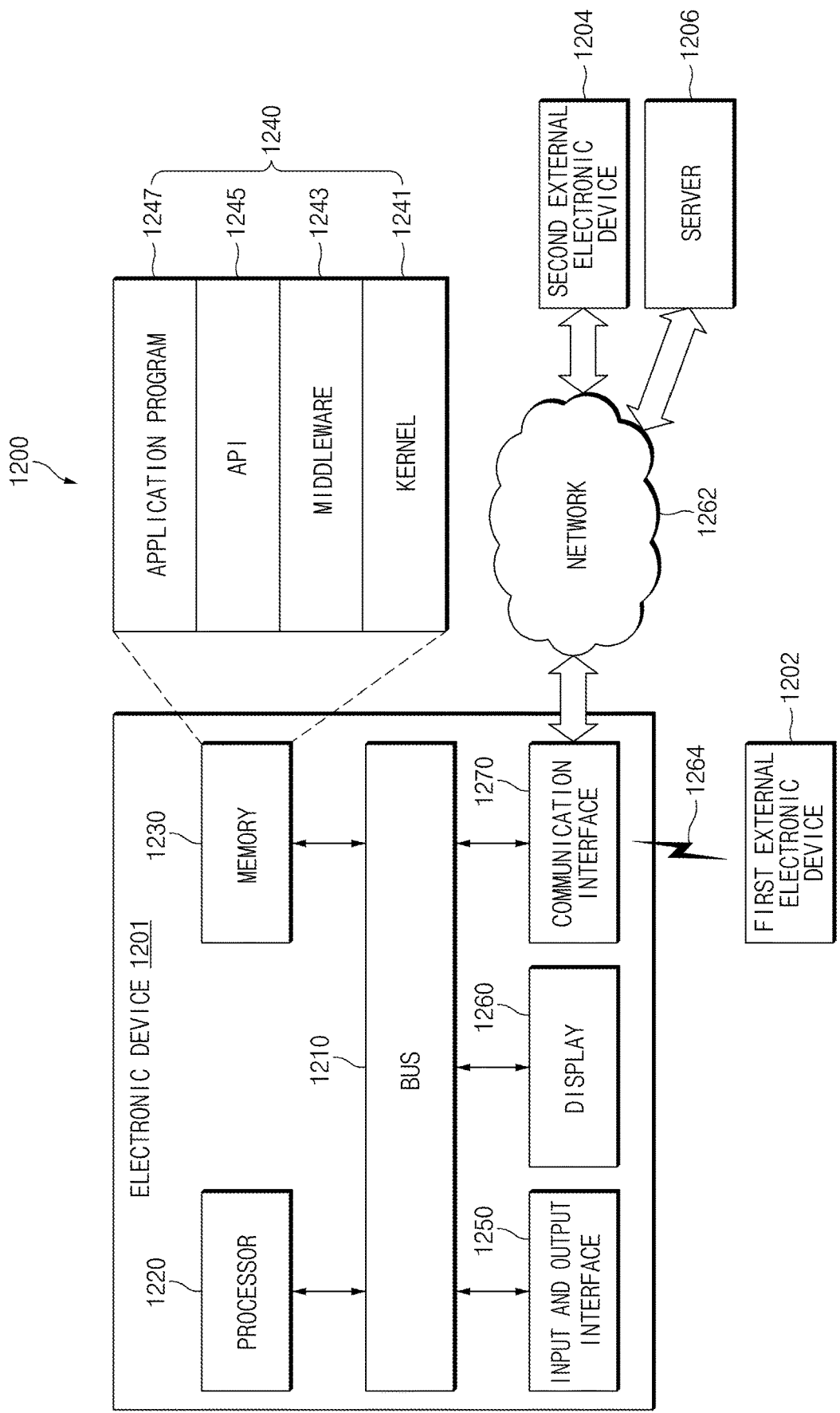
FIG. 12 is a block diagram of an electronic device in a network environment according to an embodiment of the present disclosure.

FIG. 12 is a block diagram of an electronic device in a network environment according to embodiment of the present disclosure.

Referring to FIG. 12, there is described an electronic device 1201 in a network environment 1200 according to embodiment of the present disclosure. The electronic device 1201 may include, for example, all or a part of an electronic device 100 illustrated in FIG. 1. The electronic device 1201 may include a bus 1210, a processor 1220, a memory 1230, an input/output (I/O) interface 1250, a display 1260, and a communication interface 1270. According to an embodiment, the electronic device 1201 may not include at least one of the above-described components or may further include other component(s).

For example, the bus 1210 may interconnect the above-described components 1210 to 1270 and may include a circuit for conveying communications (e.g., a control message and/or data) among the above-described components.

The processor 1220 may include one or more of a CPU, an AP, or a communication processor (CP). The processor 1220 may perform, for example, data processing or an operation associated with control or communication of at least one other component(s) of the electronic device 1201.

The memory 1230 may include a volatile and/or nonvolatile memory. For example, the memory 1230 may store instructions or data associated with at least one other component(s) of the electronic device 1201. According to an embodiment, the memory 1230 may store software and/or a program 1240.

According to an embodiment, the memory 1230 may include a main memory (not shown) and an auxiliary memory (not shown). For example, when the processor 1220 executes a program, the main memory may store the program and data, which is processed by the program. For example, the auxiliary memory may be a storage that makes it possible to supplement a limited memory capacity of the main memory, and may store a large amount of program (or data). According to an embodiment, in the case where the processor 1230 executes a specific program (or data) stored in the auxiliary memory, the specific program may be loaded from the auxiliary memory to the main memory. According to an embodiment, the main memory and the auxiliary memory may transmit or receive data between each other using a direct memory access (DMA) method without control of the processor 1220.

The program 1240 may include, for example, a kernel 1241, a middleware 1243, an application programming interface (API) 1245, and/or an application program (or "application") 1247. At least a part of the kernel 1241, the middleware 1243, or the API 1245 may be called an "operating system (OS)".

The kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete components of the electronic device 1201 so as to control or manage system resources.

The middleware 1243 may perform, for example, a mediation role such that the API 1245 or the application program 1247 communicates with the kernel 1241 to exchange data. Furthermore, the middleware 1243 may process one or more task requests received from the application program 1247 according to a priority. For example, the middleware 1243 may assign the priority, which makes it possible to use a system resource (e.g., the bus 1210, the processor 1220, the memory 1230, or the like) of the electronic device 1201, to at least one of the application program 1247 and may process the task requests.

The API 1245 may be an interface through which the application program 1247 controls a function provided by the kernel 1241 or the middleware 1243, and may include, for example, at least one interface or function (e.g., an instruction) for a file control, a window control, image processing, a character control, or the like.

The I/O interface 1250 may transmit an instruction or data, input from a user or another external device, to other element(s) of the electronic device 1201. Furthermore, the I/O interface 1250 may output an instruction or data, received from other component(s) of the electronic device 1201, to a user or another external device.

The display 1260 may include, for example, a liquid crystal display (LCD), a light-emitting diode (LED) display, an organic LED (OLED) display, or a microelectromechanical systems (MEMS) display, or an electronic paper display. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a portion of a user's body.

The communication interface 1270 may establish communication between the electronic device 1201 and an external electronic device (e.g., a first external electronic device 1202, a second external electronic device 1204, or a server 1206). For example, the communication interface 1270 may be connected to a network 1262 through wireless communication or wired communication to communicate with an external device (e.g., the second external electronic device 1204 or the server 1206).

The wireless communication may include at least one of, for example, a long-term evolution (LTE), an LTE Advance (LTE-A), a code division multiple access (CDMA), a wideband CDMA (WCDMA), a universal mobile telecommunications system (UMTS), a wireless broadband (WiBro), a global system for mobile communications (GSM), or the like, as a cellular communication protocol. Furthermore, the wireless communication may include, for example, a local area network 1264. The local area network 1264 may include at least one of Wi-Fi, Bluetooth, bluetooth low energy (BLE), Zigbee, NFC, MST, or a GNSS. The GNSS may include at least one of a global positioning system (GPS), a global navigation satellite system (Glonass), a Beidou Navigation Satellite System (hereinafter referred to as "Beidou"), or a European global satellite-based navigation system (Galileo). In this specification, "GPS" and "GNSS" may be interchangeably used.

The wired communication may include at least one of, for example, a universal serial bus (USB), a high definition multimedia interface (HDMI), a recommended standard-232 (RS-232), a power line communication, or a plain old telephone service (POTS). The network 1262 may include at least one of telecommunications networks, for example, a computer network (e.g., local area network (LAN) or wide area network (WAN)), an Internet, or a telephone network.

Each of the external first and second external electronic devices 1202 and 1204 may be a device of which the type is different from or the same as that of the electronic device 1201. According to an embodiment, the server 1206 may include a group of one or more servers. According to various embodiments, all or a part of operations that the electronic device 1201 will perform may be executed by another or plural electronic devices (e.g., the electronic devices 1202 and 1204 or the server 1206). According to an embodiment, in the case where the electronic device 1201 executes any function or service automatically or in response to a request, the electronic device 1201 may not perform the function or the service internally, but, alternatively additionally, it may request at least a part of a function associated with the electronic device 1201 at other device (e.g., the electronic device 1202 or 1204 or the server 1206). The other electronic device (e.g., the electronic device 1202 or 1204 or the server 1206) may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

Figure 13:
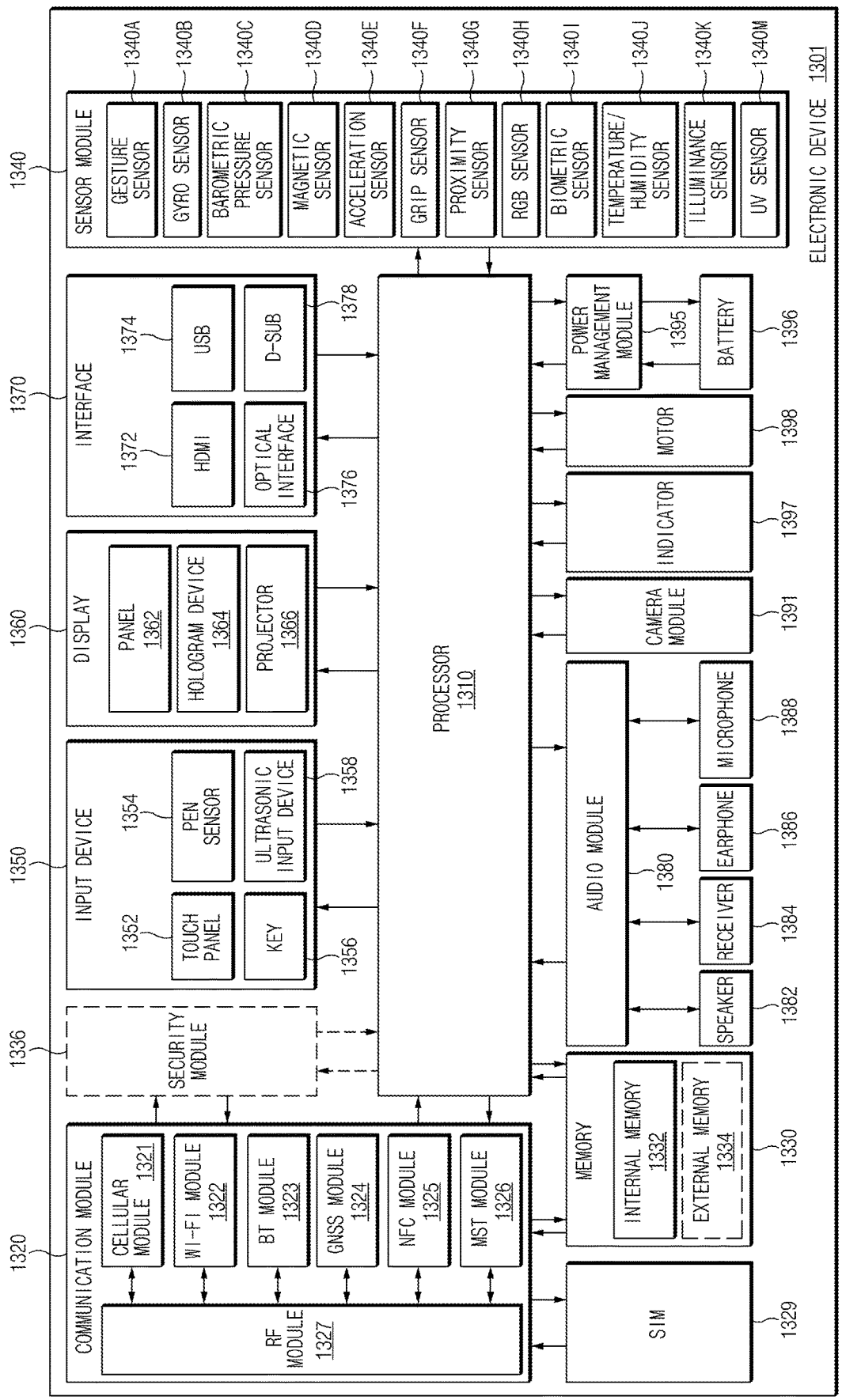
FIG. 13 is a block diagram of an electronic device according to an embodiment of the present disclosure.

FIG. 13 is a block diagram of an electronic device according to an embodiment of the present disclosure.

The electronic device 1301 may include, for example, all or a part of the electronic device 100 illustrated in FIG. 5. The electronic device 1301 may include one or more processors (e.g., an AP) 1310, a communication module 1320, a subscriber identification module 1329, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive an OS or an application program to control a plurality of hardware or software elements connected to the processor 1310 and may process and compute a variety of data. The processor 1310 may be implemented with a SoC, for example. According to an embodiment, the processor 1310 may further include a GPU and/or an image signal processor (ISP). The processor 1310 may include at least a part (e.g., a cellular module 1321) of elements illustrated in FIG. 13. The processor 1310 may load and process an instruction or data, which is received from at least one of other components (e.g., a nonvolatile memory), and may store a variety of data at a nonvolatile memory.

The communication module 1320 may be configured the same as or similar to a communication interface 1270 of FIG. 12. The communication module 1320 may include a cellular module 1321, a Wi-Fi module 1322, a Bluetooth (BT) module 1323, a GNSS module 1324 (e.g., a GPS module, a Glonass module, a Beidou module, or a Galileo module), an NFC module 1325, an MST module 1326, and a radio frequency (RF) module 1327.

The cellular module 1321 may provide voice communication, video communication, a character service, an Internet service, or the like through a communication network. According to an embodiment, the cellular module 1321 may perform discrimination and authentication of the electronic device 1301 within a communication network using a subscriber identification module 1329 (e.g., a SIM card), for example. According to an embodiment, the cellular module 1321 may perform at least a portion of functions that the processor 1310 provides. According to an embodiment, the cellular module 1321 may include a CP.

Each of the Wi-Fi module 1322, the BT module 1323, the GNSS module 1324, the NFC module 1325, or the MST module 1326 may include a processor for processing data exchanged through a corresponding module, for example. According to an embodiment, at least a part (e.g., two or more components) of the cellular module 1321, the Wi-Fi module 1322, the BT module 1323, the GNSS module 1324, the NFC module 1325, or the MST module 1326 may be included within one integrated circuit (IC) or an IC package.

The RF module 1327 may transmit and receive, for example, a communication signal (e.g., an RF signal). For example, the RF module 1327 may include a transceiver, a power amplifier module (PAM), a frequency filter, a low noise amplifier (LNA), an antenna, or the like. According to various embodiments, at least one of the cellular module 1321, the Wi-Fi module 1322, the BT module 1323, the GNSS module 1324, or the NFC module 1325, or the MST module 1326 may transmit and receive an RF signal through a separate RF module.

The subscriber identification module 1329 may include, for example, a subscriber identification module and may include unique identify information (e.g., integrated circuit card identifier (ICCID)) or subscriber information (e.g., integrated mobile subscriber identity (IMSI)).

The memory 1330 may include, for example, an internal memory 1332 or an external memory 1334. For example, the internal memory 1332 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1334 may include a flash drive, for example, compact flash (CF), secure digital (SD), micro-SD, mini-SD, extreme digital (xD), multimedia card (MMC), a memory stick, or the like. The external memory 1334 may be functionally and/or physically connected with the electronic device 1301 through various interfaces.

The security module 1336 (or security memory) (e.g., the memory 160) may be a module that includes a storage space of which a security level is higher than that of the memory 1330 and may be a circuit that guarantees a safe data storage and a protected execution environment. The security module 1336 may be implemented with a separate circuit and may include a separate processor. For example, the security module 1336 may be in a smart chip or a secure digital (SD) card, which is removable, or may include an eSE embedded in a fixed chip of the electronic device 1301. Furthermore, the security module 1336 may operate based on an OS that is different from the OS of the electronic device 1301. For example, the security module may operate based on java card open platform (JCOP) OS.

The sensor module 1340 may measure, for example, a physical quantity or may detect an operation state of the electronic device 1301. The sensor module 1340 may convert the measured or detected information to an electric signal. The sensor module 1340 may include at least one of a gesture sensor 1340A, a gyro sensor 1340B, a pressure sensor 1340C, a magnetic sensor 1340D, an acceleration sensor 1340E, a grip sensor 1340F, a proximity sensor 1340G, a color sensor 1340H (e.g., red, green, blue (RGB) sensor), a biometric sensor 1340I, a temperature/humidity sensor 1340J, an illuminance sensor 1340K, or an UV sensor 1340M. Additionally or alternatively, the sensor module 1340 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 1340 may further include a control circuit for controlling at least one or more sensors included therein. According to an embodiment of the present disclosure, the electronic device 1301 may further include a processor which is a part of the processor 1310 or independent of the processor 1310 and is configured to control the sensor module 1340. The processor may control the sensor module 1340 while the processor 1310 remains at a sleep state.

The input device 1350 may include, for example, a touch panel 1352, a (digital) pen sensor 1354, a key 1356, or an ultrasonic input unit 1358. The touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user.

The (digital) pen sensor 1354 may be, for example, a part of a touch panel or may include an additional sheet for recognition. The key 1356 may include, for example, a physical button, an optical key, a keypad, and the like. The ultrasonic input device 1358 may detect (or sense) an ultrasonic signal, which is generated from an input device, through a microphone (e.g., a microphone 1388) and may check data corresponding to the detected ultrasonic signal.

The display 1360 may include a panel 1362, a hologram device 1364, or a projector 1366. For example, the panel 1362 may be implemented to be flexible, transparent, or wearable. The panel 1362 and the touch panel 1352 may be integrated into a single module. The hologram device 1364 may display a stereoscopic image in a space using a light interference phenomenon. The projector 1366 may project light onto a screen so as to display an image. The screen may be arranged inside or outside the electronic device 1301. According to an embodiment, the display 1360 may further include a control circuit for controlling the panel 1362, the hologram device 1364, or the projector 1366.

The interface 1370 may include, for example, an HDMI 1372, a USB 1374, an optical interface 1376, or a D-subminiature (D-sub) 1378. The interface 1370 may be included, for example, in the communication interface 1270 illustrated in FIG. 12. Additionally or alternatively, the interface 1370 may include, for example, a mobile high definition link (MHL) interface, a SD card/multi-media card (MMC) interface, or an infrared data association (IrDA) standard interface.

The audio module 1380 may convert a sound and an electric signal in dual directions. At least a part of elements of the audio module 1380 may process, for example, sound information that is input or output through a speaker 1382, a receiver 1384, an earphone 1386, or a microphone 1388.

The camera module 1391 for shooting a still image or a video may include, for example, at least one image sensor (e.g., a front sensor or a rear sensor), a lens, an ISP, or a flash (e.g., an LED or a xenon lamp)

The power management module 1395 may manage, for example, power of the electronic device 1301. According to an embodiment of the present disclosure, the power management module 1395 may include a power management integrated circuit (PMIC), a charger IC, or a battery or fuel gauge. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1396 and a voltage, current or temperature thereof while the battery is charged. The battery 1396 may include, for example, a rechargeable battery or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate the following effects vibration, haptic, and the like. Although not illustrated, a processing device (e.g., a GPU) for supporting a mobile TV may be included in the electronic device 1301. The processing device for supporting a mobile TV may process media data according to the standards of DMB, digital video broadcasting (DVB), MediaFlo™, or the like.

Figure 14:
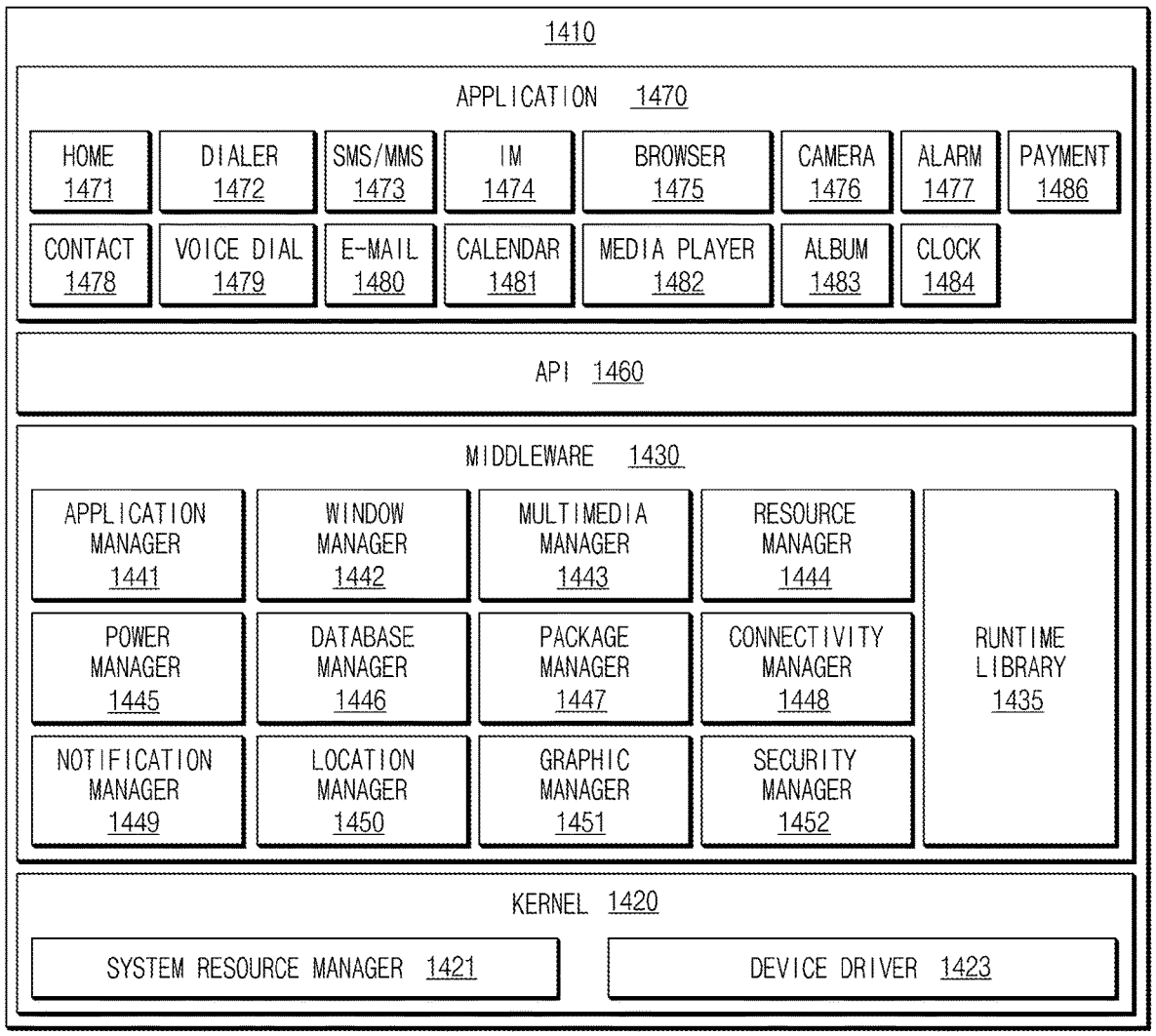
FIG. 14 is a block diagram of a program module according to an embodiment of the present disclosure.

FIG. 14 is a block diagram of a program module according to an embodiment of the present disclosure.

According to an embodiment, a program module 1410 (e.g., the program 1240 in FIG. 12) may include an OS to control resources associated with an electronic device (e.g., the electronic device 1201 in FIG. 12), and/or diverse applications (e.g., the application program 1247 in FIG. 12) driven on the OS. The OS may be, for example, android, iOS, windows, symbian, tizen, or bada.

The program module 1410 may include a kernel 1420, a middleware 1430, an API 1460, and/or an application 1470. At least a part of the program module 1410 may be preloaded on an electronic device or may be downloadable from an external electronic device (e.g., the electronic device 1202 or 1204, the server 1206, and the like).

The kernel 1420 (e.g., the kernel 1241) may include, for example, a system resource manager 1421, or a device driver 1423. The system resource manager 1421 may perform control, allocation, or retrieval of system resources. According to an embodiment, the system resource manager 1421 may include a process managing unit, a memory managing unit, or a file system managing unit. The device driver 1423 may include, for example, a display driver, a camera driver, a Bluetooth driver, a common memory driver, an USB driver, a keypad driver, a Wi-Fi driver, an audio driver, or an inter-process communication (IPC) driver.

The middleware 1430 may provide, for example, a function which the application 1470 needs in common, or may provide diverse functions to the application 1470 through the API 1460 to allow the application 1470 to efficiently use limited system resources of the electronic device. According to an embodiment, the middleware 1430 (e.g., the middleware 1243) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, or a security manager 1452.

The runtime library 1435 may include, for example, a library module which is used by a compiler to add a new function through a programming language while the application 1470 is being executed. The runtime library 1435 may perform I/O management, memory management, or capacities about arithmetic functions.

The application manager 1441 may manage, for example, a life cycle of at least one application of the application 1470. The window manager 1442 may manage a GUI resource which is used in a screen. The multimedia manager 1443 may identify a format necessary for playing diverse media files, and may perform encoding or decoding of media files by using a codec suitable for the format. The resource manager 1444 may manage resources such as a storage space, memory, or source code of at least one application of the application 1470.

The power manager 1445 may operate, for example, with a basic input/output system (BIOS) to manage a battery or power, and may provide power information for an operation of an electronic device. The database manager 1446 may generate, search for, or modify database which is to be used in at least one application of the application 1470. The package manager 1447 may install or update an application that is distributed in the form of package file.

The connectivity manager 1448 may manage, for example, wireless connection such as Wi-Fi or Bluetooth. The notification manager 1449 may display or notify an event such as arrival message, appointment, or proximity notification in a mode that does not disturb a user. The location manager 1450 may manage location information of an electronic device. The graphic manager 1451 may manage a graphic effect that is provided to a user, or manage a user interface relevant thereto. The security manager 1452 may provide a general security function necessary for system security or user authentication. According to an embodiment, in the case where an electronic device (e.g., the electronic device 1201) includes a telephony function, the middleware 1430 may further include a telephony manager for managing a voice or video call function of the electronic device.

The middleware 1430 may include a middleware module that combines diverse functions of the above-described components. The middleware 1430 may provide a module specialized to each OS kind to provide differentiated functions. Additionally, the middleware 1430 may remove a part of the preexisting components, dynamically, or may add a new component thereto.

The API 1460 (e.g., an API 1245) may be, for example, a set of programming functions and may be provided with a configuration which is variable depending on an OS. For example, in the case where an OS is the android or the iOS, it may be permissible to provide one API set per platform. In the case where an OS is the tizen, it may be permissible to provide two or more API sets per platform.

The application 1470 (e.g., the application program 1247) may include, for example, one or more applications capable of providing functions for a home 1471, a dialer 1472, an SMS/multimedia message service (MMS) 1473, an instant message (IM) 1474, a browser 1475, a camera 1476, an alarm 1477, a contact 1478, a voice dial 1479, an e-mail 1480, a calendar 1481, a media player 1482, an album 1483, a timepiece 1484, and payment 1486 or for offering health care (e.g., measuring an exercise quantity or blood sugar) or environment information (e.g., atmospheric pressure, humidity, or temperature).

According to an embodiment of the present disclosure, the application 1470 may include an application (hereinafter referred to as "information exchanging application" for descriptive convenience) to support information exchange between the electronic device (e.g., the electronic device 1201) and an external electronic device (e.g., the electronic device 1202 or 1204). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., the electronic device 1202 or 1204). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 1202 or 1204) which communicates with the electronic device, an application running in the external electronic device, or a service (e.g., a call service, a message service, or the like) provided from the external electronic device.

According to an embodiment, the application 1470 may include an application (e.g., a health care application) which is assigned in accordance with an attribute (e.g., an attribute of a mobile medical device as a kind of electronic device) of an external electronic device (e.g., the electronic device 1202 or 1204). According to an embodiment of the present disclosure, the application 1470 may include an application which is received from an external electronic device (e.g., the server 1206 or the electronic device 1202 or 1204). According to an embodiment, the application 1470 may include a preloaded application or a third party application which is downloadable from a server. The component titles of the program module 1410 according to the embodiment of the present disclosure may be modifiable depending on kinds of OSs.

According to various embodiments of the present disclosure, at least a part of the program module 1410 may be implemented by software, firmware, hardware, or a combination of two or more thereof. At least a portion of the program module 1410 may be implemented (e.g., executed), for example, by a processor (e.g., the control module 170). At least a part of the program module 1410 may include, for example, modules, programs, routines, sets of instructions, or processes, or the like for performing one or more functions. Each of the above-mentioned elements of the electronic device according to various embodiments of the present disclosure may be configured with one or more components, and the names of the elements may be changed according to the type of the electronic device. According to various embodiments, the electronic device may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments of the present disclosure may be, for example, implemented by instructions stored in a computer-readable storage media in the form of a program module. If the instructions are executed by a processor (e.g., the control module 170), the one or more processors may perform functions corresponding to the instructions.

The computer-readable storage media may include a hard disk, a floppy disk, a magnetic media (e.g., a magnetic tape), an optical media (e.g., a compact disc ROM (CD-ROM) and a digital versatile disc (DVD)), a magneto-optical media (e.g., a floptical disk), and hardware devices (e.g., a ROM, a RAM, or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included therein. Operations executed by modules, program modules, or other elements may be executed by a successive method, a parallel method, a repeated method, or a heuristic method. Also, a part of operations may be executed in different sequences, omitted, or other operations may be added.

According to various embodiments of the present disclosure, an electronic device may provide a variety of additional services suitable for a user by variably generating track data based on the request of a user or the use purpose of a service.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display configured to receive a user command;
a biometric sensor;
a communication circuit configured to communicate with an external device;
a memory configured to store a private key; and
a processor electrically connected to the display, the biometric sensor, the communication circuit and the memory, wherein the memory stores instructions that, when executed, cause the processor to:
receive a payment request of a user using the display,
in response to the payment request, receive a payment request of a user using the biometric sensor,
perform biometric authentication based on obtained biometric information,
if the biometric authentication is completed, transmit first information encrypted by using the private key to an authentication server for user authentication using the communication circuit,
receive second information corresponding to result of the user authentication performed by the authentication server based on the first information using the communication circuit,
in response to receipt of the second information, transmit a payment data request to a payment server for issuing payment data or acting to issue the payment data using the communication circuit,
receive payment data issued based on the payment data request, being used in one time and corresponding to at least one of track 1, track 2 and track 3 of magnetic payment card from the payment server using the communication circuit, and transmit a magnetic signal generated based on the received the payment data using a magnetic communication module.

2. The electronic device of claim 1, wherein the magnetic signal is transmitted using a magnetic secure transmission (MST).

3. The electronic device of claim 1, wherein the instructions further cause the processor to store the received payment data in the memory or a secure memory element.

4. The electronic device of claim 3, wherein the secure memory element includes at least one of an embedded secure element (eSE), an embedded subscriber identity module (eSIM) or a trusted execution environment (TEE).

5. The electronic device of claim 1, wherein the transmitted magnetic signal includes at least one of validity period, at least one of service information, encryption information, account information, deposit information or withdrawal information associated with the received payment data.

6. The electronic device of claim 1, wherein at least one of service information includes information associated with at least one of providing an advertisement, issuing a coupon, collecting a point, discounting a charge, outputting a receipt, discounting a fee, reducing a fee or providing a text service.

7. The electronic device of claim 1, wherein the payment data includes payment token.

8. The electronic device of claim 1, wherein the second information includes at least one of user information, user account information, payment information, card information, account information, deposit information or withdrawal information.

9. The electronic device of claim 1, wherein the payment data is generated by the payment server based on the payment server confirming validity of the user authentication to the authentication server.

10. The electronic device of claim 1, wherein the memory stores at least one biometric information, wherein the instructions cause the processor to: perform the biometric authentication based on comparing the obtained biometric information with the stored at least one biometric information.

11. The electronic device of claim 1, wherein the instructions cause the processor to: receive at least one service information, and generate the magnetic signal based on the received payment data and the at least one service information.

12. The electronic device of claim 11, wherein the instructions cause the processor to:
display, on the display, at least one user interface for receiving the at least one service information,
receive a user input for the user interface as the at least one service information using the display, and
generate the magnetic signal based on the received user input.

13. The electronic device of claim 12, wherein the instructions cause the processor to:
generate a first magnetic signal when the received input is associated with a first service, and
generate a second magnetic signal when the received input is associated with a second service.

14. The electronic device of claim 12, wherein the at least one service information is represented by two-digit data in the payment data corresponding to the track 2.

15. The electronic device of claim 14, wherein the two-digit data is located at the 25th and 26th digits in the payment data corresponding to the track 2.

16. A method of an electronic device for making a payment, the method comprising:
receiving a payment request of a user;
in response to the payment request, obtaining biometric information of the user;
performing biometric authentication based on the obtained biometric information;
if the biometric authentication is completed, transmitting first information encrypted by using a private key to an authentication server for user authentication;
receiving second information corresponding to result of the user authentication performed by the authentication server based on the first information;
in response to receipt of the second information, transmitting a payment data request to a payment server for issuing payment data or acting to issue the payment data;
receiving payment data issued based on the payment data request, being used in one time and corresponding to at least on of track 1, track 2 and track 3 of magnetic payment card from the payment server; and
transmitting a magnetic signal generated based on the received payment data.

* * * * *